(12) United States Patent
Jamshidi et al.

(10) Patent No.: US 8,342,031 B2
(45) Date of Patent: Jan. 1, 2013

(54) CAPACITIVE STRAIN SENSOR

(75) Inventors: Babak Jamshidi, Berkeley, CA (US);
Albert P. Pisano, Danville, CA (US)

(73) Assignee: The Regents of the University of California, Oakland, CA (US)

( * ) Notice: Subject to any disclaimer, the term of this patent is extended or adjusted under 35 U.S.C. 154(b) by 628 days.

(21) Appl. No.: 12/606,022

(22) Filed: Oct. 26, 2009

(65) Prior Publication Data
US 2010/0162824 A1 Jul. 1, 2010

Related U.S. Application Data

(60) Provisional application No. 61/108,840, filed on Oct. 27, 2008.

(51) Int. Cl.
*G01L 1/00* (2006.01)
(52) U.S. Cl. ......................................... 73/780
(58) Field of Classification Search ............ 73/780, 73/862.52, 862.626
See application file for complete search history.

(56) References Cited

U.S. PATENT DOCUMENTS

| | | | |
|---|---|---|---|
| 5,747,698 A | 5/1998 | Spillman, Jr. et al. | |
| 6,532,824 B1 * | 3/2003 | Ueno et al. | 73/780 |
| 6,606,913 B1 * | 8/2003 | Gianchandani | 73/777 |
| 7,204,162 B2 | 4/2007 | Johnson et al. | |
| 7,302,858 B2 | 12/2007 | Walsh et al. | |
| 7,380,461 B2 | 6/2008 | Majeti | |
| 2009/0007669 A1 * | 1/2009 | Fukaura | 73/514.32 |

OTHER PUBLICATIONS

Azevedo, R.G., "Design and Evaluation of a MEMS Offset Capacitive Comb Strain Sensor", M.Sc. Dissertation, University of California, Berkeley, Department of Mechanical Engineering, (2003) 94 pp.
Chaimanonart et al., "Remote RF Powering System for MEMS Strain Sensors", Proceedings of IEEE Sensors, vol. 3, pp. 1522-1525, (2004).
Guo J. et al., "Buckled Beam Linear Output Capacitive Strain Sensor", Solid State Sensor, Actuator and Microsystems Workshop, (2004) 6pp.

* cited by examiner

*Primary Examiner* — Jewel V Thompson
(74) *Attorney, Agent, or Firm* — Bret E. Field; Rudy J. Ng; Bozicevic, Field & Francis LLP

(57) ABSTRACT

Provided are capacitive strain sensors. In certain embodiments, the capacitive strain sensor can continuously and accurately measure strain in corrosive ambient conditions and may operate up to 370° C. or more in air. The sensor includes a differential capacitor that includes a bending beam structure. In some instances, the sensor is configured to increase the effect of strain in a substrate along a sensing axis while attenuating the effect of cross-axis strain. Also provided are methods of making the capacitive strain sensors, e.g., using Micro-Electro-Mechanical System (MEMS) fabrication techniques, and methods of using the capacitive strain sensors.

19 Claims, 15 Drawing Sheets

CAPACITIVE STRAIN SENSOR

CROSS-REFERENCE TO RELATED APPLICATION

This application claims the benefit of U.S. Provisional Patent Application No. 61/108,840, filed Oct. 27, 2008, which application is incorporated herein by reference in its entirety.

REFERENCE TO GOVERNMENT SUPPORT

This invention was made in part with government support under a grant from the Defense Advanced Research Projects Agency (DARPA) (Grant No. NBCH1050002). The government has certain rights in this invention.

INTRODUCTION

Capacitive strain sensors measure the strain in a substrate through mechanically induced capacitance change. However, large gauge-length, lack of out-of axis strain effect compensation and temperature sensitivity of the material are properties that limit the range of applications and the type of ambient conditions in which traditional capacitive strain sensors could reliably operate.

Embedded sensors have increasingly become more popular in industries where it is desirable to accurately monitor phenomena in physical systems. Embedded sensors are placed as close as possible to an incident in order to achieve highly accurate measurements. Such placement imposes harsh environmental conditions on the sensors which can alter their resolution and accuracy. Large vibrations, high-g shocks, presence of corrosive gases, continual contact wearing and high temperature are among these conditions. Traditional semiconductor technology, which uses silicon, is not able to withstand such extreme conditions due to the sensitivity of silicon's material properties to environmental effects, as well as its low resistance to erosion and oxidation.

SUMMARY

Provided are capacitive strain sensors. In certain embodiments, the capacitive strain sensor can continuously and accurately measure strain in corrosive ambient conditions and may operate up to 370° C. or more in air. The sensor includes a differential capacitor that includes a bending beam structure. In some instances, the sensor is configured to increase the effect of strain in a substrate along a sensing axis while attenuating the effect of cross-axis strain. Also provided are methods of making the capacitive strain sensors, e.g., using Micro-Electro-Mechanical System (MEMS) fabrication techniques, and methods of using the capacitive strain sensors.

DETAILED DESCRIPTION

Figures 1A, 1B:
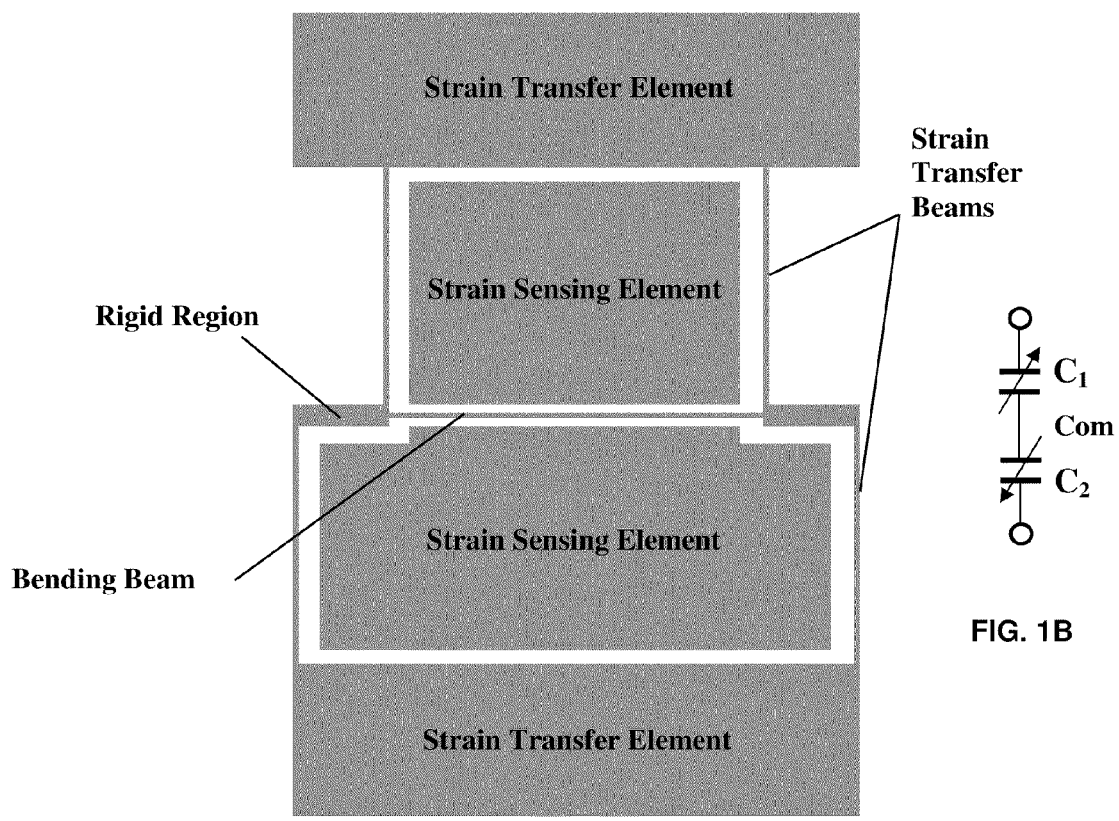
FIG. 1A shows a schematic of a top view of an embodiment of a subject capacitive strain sensor.
FIG. 1B shows a schematic of an equivalent circuit.
Figure 2:
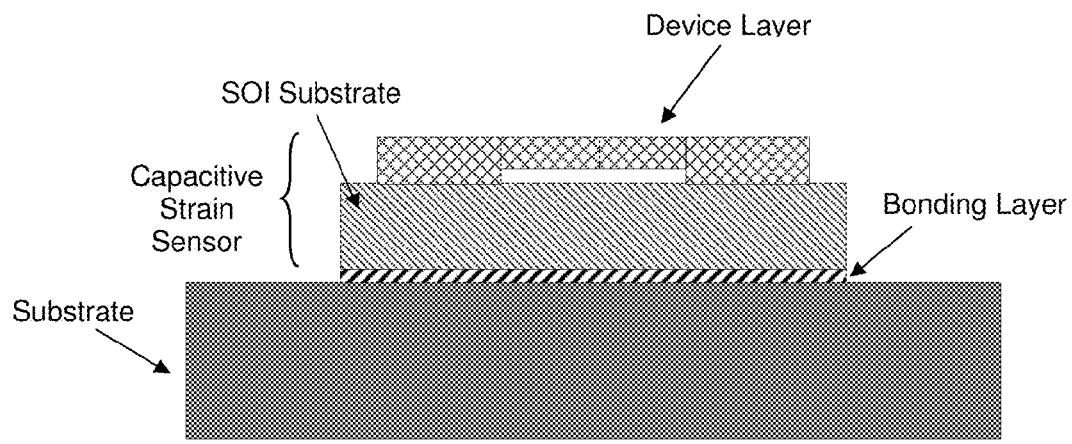
FIG. 2 shows a schematic of a side view of an embodiment of the capacitive strain sensor attached to a substrate.

Provided are capacitive strain sensors. In certain embodiments, the capacitive strain sensor can continuously and accurately measure strain in corrosive ambient conditions and may operate up to 370° C. or more in air. The sensor includes a differential capacitor that includes a bending beam structure. In some instances, the sensor is configured to increase the effect of strain in a substrate along a sensing axis while attenuating the effect of cross-axis strain. Also provided are methods of making the capacitive strain sensors using Micro-Electro-Mechanical System (MEMS) fabrication techniques and methods of using the capacitive strain sensors.

Accordingly, certain embodiments include a capacitive strain sensor that includes a differential capacitor, which includes a first strain sensing element, a second strain sensing element, and a bending beam, where the bending beam is positioned between the first strain sensing element and the second strain sensing element, and where the sensor is configured to enhance the effect of strain in a substrate along a sensing axis and attenuate the effect of strain in the substrate along a cross-axis transverse to the sensing axis. In some cases, the strain sensor also includes a first strain transfer element and a second strain transfer element, where the bending beam is operatively coupled to the first strain transfer element and the second strain transfer element such that strain in the substrate deforms the bending beam causing a detectable change in capacitance of the sensor. The terms "operatively connected", "operatively linked" and "operatively coupled", as used herein, are used interchangeably and mean that the elements are connected to each other either directly or indirectly.

The strain sensor further may include one or more strain transfer beams, where the one or more strain transfer beams operatively couple the bending beam to the first strain transfer element and the second strain transfer element. For example, the strain sensor may have four strain transfer beams, where the four strain transfer beams are attached to the bending beam at four points, where the four points define a first rigid region, a bending region, and a second rigid region along the bending beam. The first rigid region and the second rigid region may have thicknesses greater than the thickness of the bending region. For example, the first rigid region and the second rigid region can have thicknesses ranging from 10 μm to 20 μm. In addition, the bending region can have a thickness of 5 μm or less, such as 2 μm. In some cases, the strain transfer beams have a thickness of 5 μm or less, such as 3 μm.

In certain embodiments, the strain sensor is configured to detect strain in the substrate along the sensing axis. The first strain transfer element, the second strain transfer element, the first strain sensing element, and the second strain sensing element may be aligned along the sensing axis. In some cases, the strain sensor attenuates 90% or more of the effect of strain in the substrate along the cross axis. For example, in particular instances, the strain sensor attenuates 99% or more of the effect of strain in the substrate along the cross axis.

In certain embodiments, the strain sensor is also coated with a passivation layer. The passivation layer can have a thickness of 70 nm or less. For example, the passivation layer can have a thickness of 60 nm or less. In some embodiments, the passivation layer includes silicon carbide. In addition, the strain sensor may have a sensitivity of 45 aF/με or more. For example, the strain sensor may have a sensitivity of 50 aF/με or more.

Also provided are methods for detecting strain in a substrate. The method includes the step of detecting a change in capacitance of a capacitive strain sensor on a substrate, where the capacitive strain sensor includes a differential capacitor that includes a first strain sensing element, a second strain sensing element, and a bending beam positioned between the first strain sensing element and the second strain sensing element such that strain in the substrate deforms the bending beam causing the change in capacitance. In addition the method also includes the step of determining a value corresponding to the strain in the substrate based on the change in capacitance.

In certain embodiments, methods for detecting strain in a substrate include the step of attaching a capacitive strain sensor to a substrate, wherein the capacitive strain sensor includes a differential capacitor that includes a first strain sensing element, a second strain sensing element, and a bending beam positioned between the first strain sensing element and the second strain sensing element, such that strain in the substrate deforms the bending beam. The method also includes the steps of: detecting a change in capacitance of the differential capacitor caused by deformation of the bending beam; and determining a value corresponding to the strain in the substrate based on the change in capacitance.

Additional embodiments include a method of making a capacitive strain sensor. The method includes etching a silicon on insulator (SOI) wafer in the pattern of a capacitive strain sensor, where the capacitive strain sensor includes a differential capacitor that includes a first strain sensing element, a second strain sensing element, and a bending beam positioned between the first strain sensing element and the second strain sensing element. The method may also include releasing the capacitive strain sensor from the wafer.

In certain embodiments, the method further includes the step of applying a passivation layer to the capacitive strain sensor. The passivation layer can have a thickness of 70 nm or less. For example, the passivation layer can have a thickness of 60 nm or less. The passivation layer may include silicon carbide.

Below, the subject capacitive strain sensors are described first in greater detail. In addition, methods of making the capacitive strain sensors are disclosed, followed by a review of the various methods in which the capacitive strain sensors may find use, as well as a discussion of various representative applications in which the subject capacitive strain sensors and methods find use.

Capacitive Strain Sensors

Provided are capacitive strain sensors. In certain embodiments, the capacitive strain sensors include a differential capacitor. Differential capacitors are capacitors that have a structure that includes first and second static conductive layers and a dynamic conductive layer suspended therebetween. Differential capacitance may be detected by measuring and comparing the capacitance between the dynamic layer and the first static layer and also between the dynamic layer and the second static layer.

In some cases, the capacitive strain sensors are high-resolution capacitive strain sensors. Certain embodiments include a four-point bending beam structure that is configured to enhance the effect of strain in a substrate along a sensing axis and attenuate the effect of cross-axis strain in the substrate. In addition, the capacitive strain sensors may be poly-silicon carbide passivated capacitive strain sensors, as described in greater detail below. The capacitive strain sensors may be used for real-time strain monitoring of substrates in the presence of harsh ambient conditions (e.g., high temperature, large vibrations, corrosive ambient conditions, etc.). In certain embodiments, the strain sensors can have a sub-millimeter gauge-length which allows for precise measurement of strain in any substrate.

An exemplary capacitive strain sensor according to the present disclosure is shown in FIG. 1A. The strain sensor depicted in FIG. 1A includes a first strain sensing element and a second strain sensing element which are attached to a substrate. The strain sensing elements can be attached to the substrate using an attachment layer. The attachment layer can include any attachment means known to those of skill in the art, such as but not limited to adhesives, solder, brazing, welding, and the like. In cases where the strain sensor is used in harsh conditions, the attachment layer should be able to maintain fixation of the strain sensor to the substrate in the conditions the strain sensor is exposed to (e.g., high temperature, large vibrations, corrosive ambient conditions, etc.). In certain embodiments, the attachment layer facilitates transfer of strain from the substrate to the strain sensor. For example, the attachment layer may be configured to transfer substantially all the strain in the substrate to the strain sensor. By "substantially" is meant 80% or more, 85% or more, 90% or more, such as 95% or more, including 98% or more, for example 99% or more. In some instances, the strain sensor is able to detect substantially all the strain in the substrate along the sensing axis. Detecting substantially all the strain in the substrate along the sensing axis may facilitate a maximization in the accuracy of the strain sensor. Maximization of the accuracy of the strain sensor may also be facilitated by using an attachment layer that is configured to accommodate thermal mismatch (i.e., differences in the rate and/or extent of thermal expansion and contraction) that may occur between the substrate and the strain sensor. In some instances, the detection of false strain readings by the strain sensor due to thermal mismatch between the substrate and the strain sensor is minimized.

Embodiments of the strain sensors may be attached to the substrate using intermetallic bonding techniques, such as soldering, brazing, welding, etc. In some instances, the strain sensors are attached to the substrate by brazing. Any suitable braze material may be used. For example, a braze metal or braze alloy may be used. In certain embodiments, the braze material is compatible with both the substrate material and the strain sensor. Examples of braze metals that may be used include, but are not limited to, tin, indium, bismuth, lead, zinc, aluminum, silver, cadmium, and the like. In certain cases, a braze alloy is used, such as, but not limited to, In—Sn, Sn—Bi, Pb—Sn, Sn—Zn, Sn—Ag, Zn—Al—Ag, etc. Where desired, the braze alloy includes S-Bond 400 (S-Bond Technologies, Lansdale, Pa.).

In certain embodiments, the braze material maintains fixation of the strain sensor to the substrate in the conditions the strain sensor is exposed to (e.g., high temperature, large vibrations, corrosive ambient conditions, etc.). In some instances, the braze material has a melting temperature that is greater than the maximum temperature the strain sensor is exposed to during use. For example, the braze material may have a melting temperature of 450° C. or more, 500° C. or more, 550° C. or more, 600° C. or more, 650° C. or more, 700° C. or more, 750° C. or more, 800° C. or more, 850° C. or more, 900° C. or more, 950° C. or more, or 1000° C. or more. In addition, the braze material may have a melting temperature less than the melting temperatures of the substrate material and the strain sensor.

Figure 16:
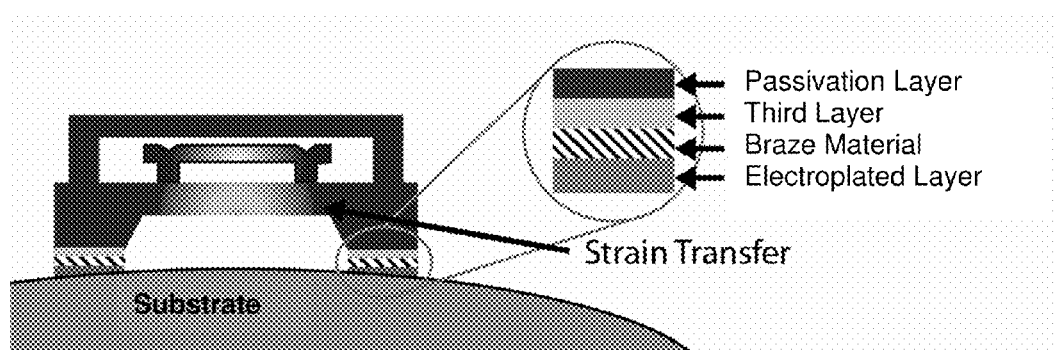
FIG. 16 shows a schematic of a silicon carbide passivated strain sensor attached to a substrate.

FIG. 16 shows a schematic of a silicon carbide passivated strain sensor attached to a substrate. In certain embodiments, the attachment layer includes one or more layers, such as 2 layers or more, 3 layers or more, 4 layers or more, 5 layers or more, etc. For example, the attachment layer may include a first layer disposed over a substrate, a second layer disposed over the first layer, and a third layer disposed over the second layer. The strain sensor may be disposed over the third layer. In some instances, the first layer is an electroplated layer that is formed on the substrate by electroplating. The first layer can include metals, such as, but not limited to, copper, nickel, and the like. Where desired, the second layer is the braze material, as described above. The third layer may include metals, such as, but not limited to, copper, nickel, and the like.

The strain sensor also includes a bending beam positioned in a gap between the first sensing element and the second sensing element. The bending beam is not directly attached to the substrate and is free to bend within the gap between the first sensing element and the second sensing element. Together the first strain sensing element, the second strain sensing element and the bending beam form a differential capacitor. The strain sensor detects strain in a substrate by measuring changes in the capacitance of the differential capacitor due to bending of the bending beam between the first sensing element and the second sensing element.

In certain embodiments, the strain sensor includes a first strain transfer element and a second strain transfer element. The first strain transfer element and the second strain transfer element are attached to the substrate and transfer strain in the substrate to the bending beam. To transfer strain in the substrate to the bending beam, the first strain transfer element and the second strain transfer element are operatively coupled to the bending beam by one or more strain transfer beams. In some embodiments, the bending beam is operatively coupled to the first strain transfer element and the second strain transfer element by four strain transfer beams. For example, the first strain transfer element may be operatively coupled to the bending beam by two strain transfer beams and the second strain transfer element may be operatively coupled to the bending beam by two strain transfer beams. The four strain transfer beams may be attached to the bending beam at four points.

In certain embodiments, the structure of the four strain transfer beams attached to the bending beam resembles the structure of a four-point bending beam. In some cases, the bending beam has one strain transfer beam attached at one end of the bending beam and a second strain transfer beam attached at the opposite end of the bending beam. In addition, the bending beam may have a third strain transfer beam and a fourth strain transfer beam attached at positions away from the ends of the strain transfer beam. The four strain transfer beams may be attached to the bending beam at four points, where the four points define a first rigid region, a bending region and a second rigid region along the bending beam. The first rigid region and the second rigid region may be positioned at the ends of the bending beam. In addition, the bending region of the bending beam may be positioned between the first rigid region and the second rigid region. In some cases, the rigid regions stiffen both ends of the bending beam. In certain embodiments, the rigid regions facilitate the transfer of displacements of the strain transfer elements to the bending region of the bending beam. Stated another way, the rigid regions may impose maximum displacement at the boundaries of the flexible bending region due to their rigid body characteristics.

Because the strain transfer elements are attached to the surface of the substrate, tension or compression of the substrate will be transferred to the strain transfer elements as movement of the first strain transfer element relative to the second strain transfer element. Movement of the first strain transfer element relative to the second strain transfer element is transferred to the bending beam through the strain transfer beams. In some cases, the movement of the first and second strain transfer elements causes the bending beam to deform. Deformations in the bending beam may cause a detectable change in the capacitance of the differential capacitor of the strain sensor.

Figure 3:
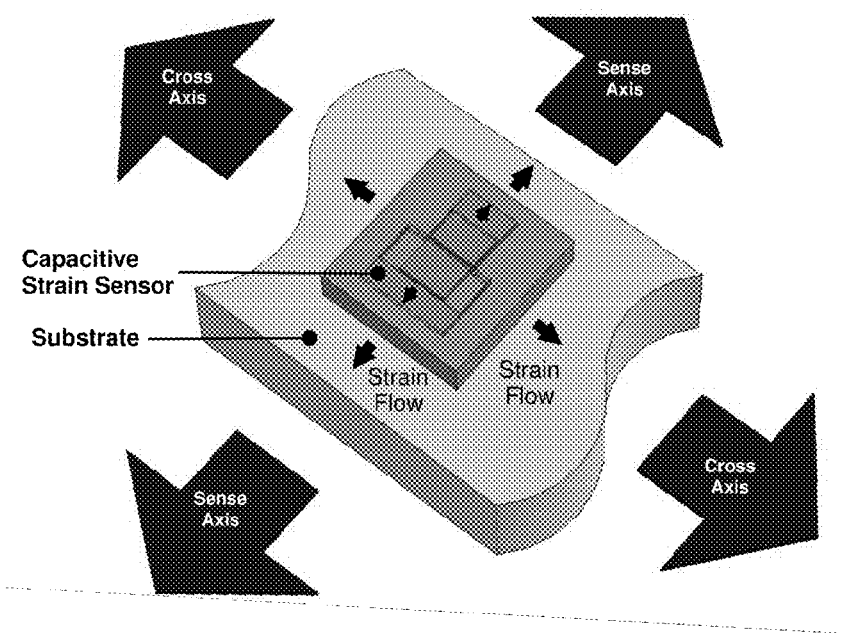
FIG. 3 shows a schematic of an overview of strain flow from the substrate through the strain transfer elements of the capacitive strain sensor.

In certain embodiments, the strain sensor is configured to detect strain in the substrate along a sensing axis. The sensing axis may be an axis that is substantially aligned with the strain sensing elements and the strain transfer elements of the sensor. In some embodiments, the first strain transfer element, the second strain transfer element, the first strain sensing element, and the second strain sensing element are aligned along the sensing axis (see FIG. 3). Where desired, the sensing axis is substantially parallel to the direction of strain in the substrate. Small displacements of the strain transfer elements may result in a significantly detectable deformation of the bending beam. In certain embodiments, the strain sensor is configured to enhance the effect of strain in the substrate along the sensing axis. In some cases, the strain sensor is configured to attenuate the effect of strain along the cross-axis transverse to the sensing axis, as described in more detail below.

Figure 4:
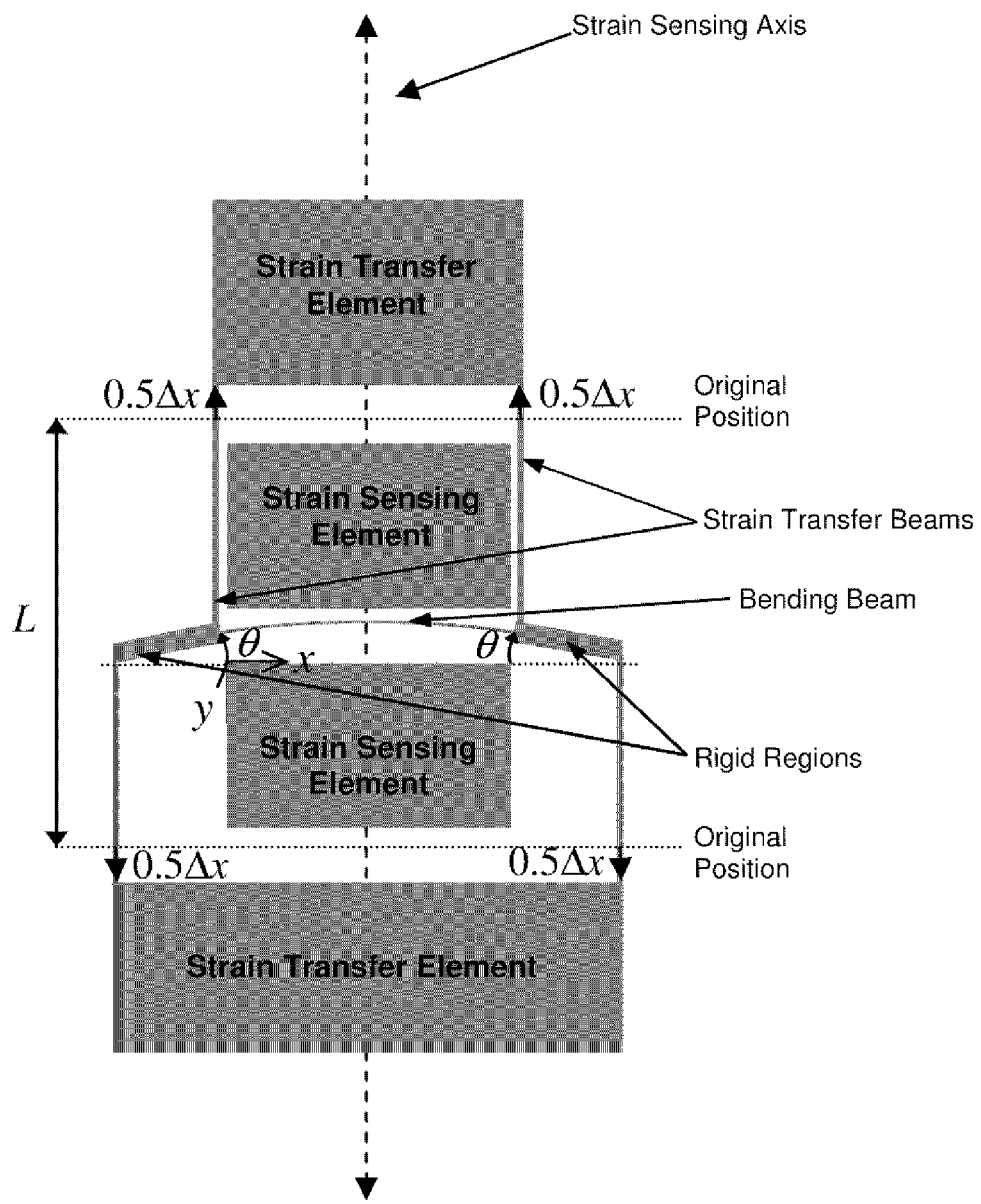
FIG. 4 shows a schematic of a top view of the capacitive strain sensor of the present disclosure. Strain along the sensing axis deforms the bending beam.

The effect of strain in the substrate along the sensing axis is illustrated in FIG. 4. The applied strain, $\epsilon$, transferred through the substrate to the strain sensor, moves the strain transfer elements apart from or towards each other by:

$$\Delta x = \epsilon L$$

where L is the gauge length (i.e., the distance between the strain transfer elements). The size of the gauge length of the device determines the level of performance which the sensor can achieve. In certain embodiments, the strain sensor has a sub-millimeter gauge length. A sub-millimeter gauge length may allow the strain sensor to monitor small and/or intense strain fields. The strain transfer beams may be pushed, pulled or transversely moved by the applied Δx, which consequently displaces and rotates the rigid regions of the bending beam. If the total stretch on the gauge length L is Δx, then each of the strain transfer elements will move the connected strain transfer beams and thus move each side of the rigid regions by 0.5Δx (see FIG. 4). The rigid body characteristics of the rigid regions translate the displacements of the rigid regions to a rotation $\theta_r$ of the bending beam, which is given by the following equation.

$$\theta_r = \frac{\Delta x}{L_r}$$

where $L_r$ is the length of the rigid regions. The resultant displacements and rotations deflect the middle bending region of the bending beam, which causes an equal and opposite gap change in $C_1$ and $C_2$, the capacitances of the differential capacitor. Although the capacitance change on each side may be nonlinear, the differential measurement can amplify the capacitance change signal ($\Delta C=|C_1-C_2|$) and substantially suppress the nonlinearity in the performance range. In certain embodiments, the performance range of the sensor ranges from 1-50,000με, such as from 1-10,000με, including from 1-5000με, for example from 1-1000με.

Figure 5:
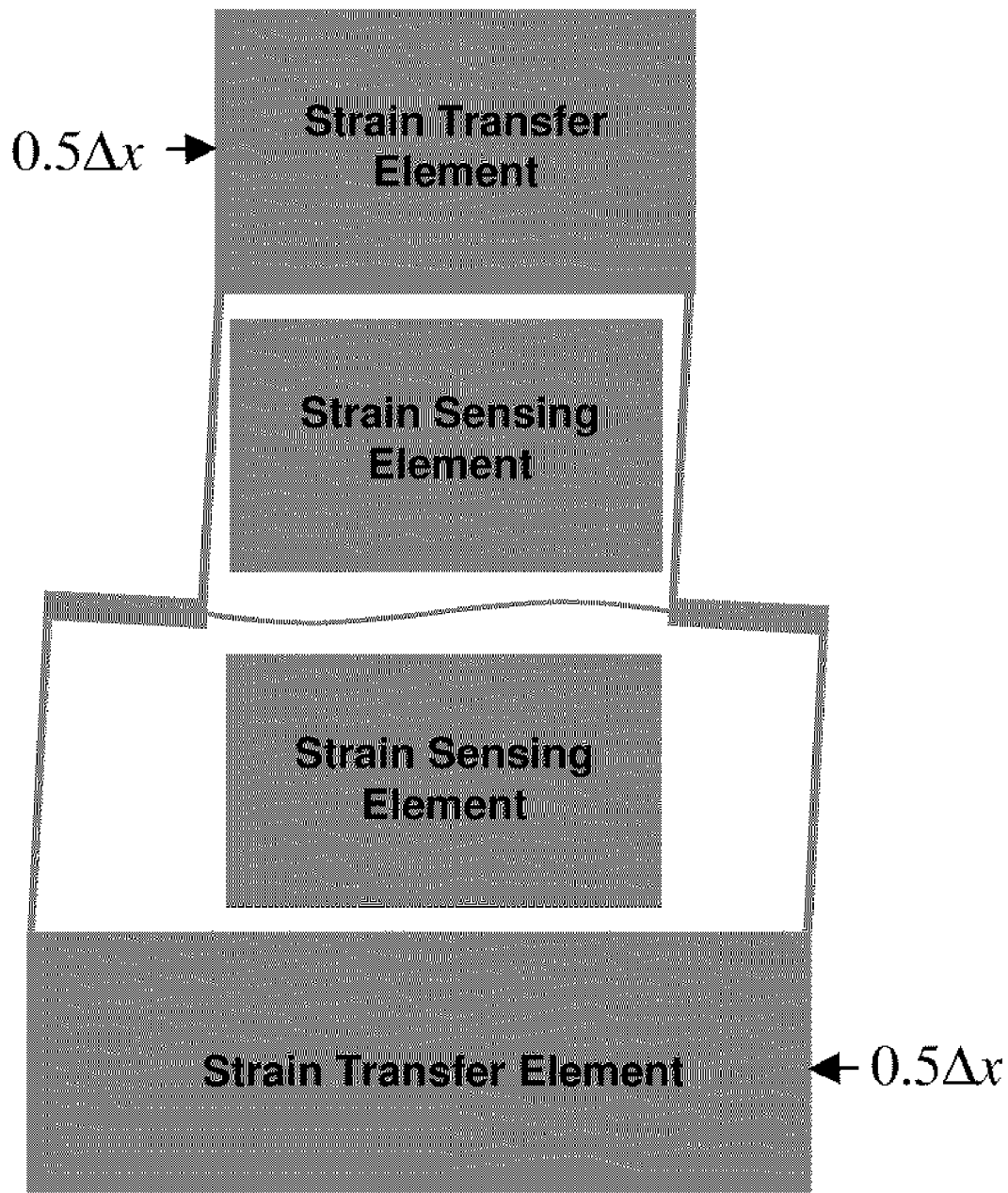
FIG. 5 shows a schematic of a top view of an embodiment of the capacitive strain sensor. Cross-axis (shear) strain deforms the bending beam in an "S" shape.

The effect of strain in the substrate along the cross-axis is illustrated in FIG. 5. The cross-axis strain in the substrate may stretch, compress or provide a shear stress on the strain sensor. In certain embodiments, the shear effect dominates the cross-axis strain. As shown in FIG. 5, the shear effect may move the structures of the strain sensor laterally. The shear effect of the strain sensor may cause two types of movement of the bending beam. First, the bending beam may move sideways (e.g., in a direction substantially parallel to the cross-axis) due to the lateral motion of the strain transfer beams. In certain embodiments, the bending beam is longer than the strain sensing elements (i.e., L≦1 mm) therefore, the capacitive area does not change due to such lateral motion and thus produces substantially no detectable signal. Second, the lateral displacement of the structures of the strain sensor due to the shear effect may deform the middle bending region of the bending beam into an S-shape by providing a rotational boundary condition $\theta_T$, given by the following equation.

$$\theta_T = \frac{\Delta x_T}{L}$$

where $\Delta x_T$ is the lateral displacement and $\theta_T$ is the end rotation for the middle bending region.

The structure of the sensor may be configured to attenuate the effect of strain in the substrate along the cross-axis. For example, the S-shaped curve may be symmetric to the first order. As such, there will be no net change in the capacitance of the differential capacitor, and thus substantially no detectable signal. When a cross-axis strain is applied to the sensor, the deformation energy may be absorbed by the strain transfer beams, which either shear or stretch the structure of the strain sensor. Both cross-axis shear and stretch conditions may have orders of magnitude smaller effect than the sense-axis transduction and are attenuated by the structure of the differential capacitor. Superposition of the results from both the sense-axis and cross-axis can generate a strong sense-axis output signal.

In some cases, the capacitive strain sensor is connected to a system for measuring the capacitance of the strain sensor. The system can be configured to detect changes in the capacitance of the differential capacitor of the strain sensor. The system can then determine a value corresponding to the strain in the substrate based on the change in capacitance. In some cases, the system for measuring the capacitance of the strain sensor includes a commercial, off-the-shelf (COTS) capacitive readout chip. As used herein, the terms "commercial, off-the-shelf" or "COTS" refer to products that are ready-made and available for sale, lease, or license to the general public. In these cases, the capacitive readout chip can have low-noise, such as a noise level of 8 aF/√Hz or less, including 6 aF/√Hz or less, for example, 4 aF/√Hz or less, or 2 aF/√Hz or less. In certain embodiments, the strain sensor has a sensitivity of 10 aF/με or more, such as 20 aF/με or more, including 30 aF/με or more, 40 aF/με or more, 50 aF/με or more, 60 aF/με or more, 70 aF/με or more, 80 aF/με or more, 90 aF/με or more, or 100 aF/με or more. Where desired, the strain sensor has a sensitivity of 45 aF/με or more. In some instances, the strain sensor has a sensitivity of 50 aF/με or more.

In some instances, the system for measuring the capacitance of the strain sensor also includes an amplifier. In some cases, the system also includes a display for outputting data and/or results to a user in a human-readable format. In some cases, the system also includes a communication link with other devices, such as but not limited to a wired communication link (e.g., a USB, serial, Ethernet, or parallel interface, and the like), or a wireless communication link (e.g., Bluetooth, 802.11, cellular, infrared, RF, and the like).

In certain embodiments, the capacitive strain sensor has a gauge length (L) ranging from 10 μm to 5000 μm, such as from 100 μm to 2000 μm, including 500 μm to 1500 μm. Where desired, the strain sensor has a gauge length of 1000 μm. The initial capacitive gap ($g_o$) is the gap between the first strain sensing element and the second strain sensing element when no stain is applied. In some cases, the initial capacitive gap ranges from 1 μm to 20 μm, such as from 2 μm to 15 μm, including from 3 μm to 10 μm. Where desired, the initial capacitive gap is 6 μm. In certain embodiments, the rigid regions of the bending beam have a length ($L_r$) ranging from 10 μm to 200 μm, such as from 50 μm to 150 μm, including from 75 μm to 125 μm. Where desired, the rigid regions have a length of 100 μm. In certain embodiments, the rigid regions have a thickness ranging from 1 μm to 40 μm, such as from 2 μm to 30 μm, including from 5 μm to 20 μm. Where desired, the rigid regions have a thickness of 14 μm. In certain embodiments, the bending region has a thickness that is less than the thickness of the rigid regions. For example, the thickness of the bending region may range from 1 μm to 10 μm, such as from 1 μm to 7 μm, including 1 μm to 5 μm. Where desired, the bending region has a thickness of 2 μm. In certain embodiments, the strain transfer beams have a thickness greater than the thickness of the bending region, but less than the thickness of the rigid regions. For example, in some cases, the strain transfer beams have a thickness ranging from 1 μm to 10 μm, such as from 2 μm to 7 μm, including from 2 μm to 5 μm. Where desired, the strain transfer beams have a thickness of 3 μm.

The following sections provide additional embodiments and disclosure allowing one of skill in the art to make and use the disclosed capacitive strain sensors. Methods for making and using the capacitive strain sensors of the present disclosure are also discussed.

Methods

Provided are methods for detecting strain in a substrate. The method includes the step of detecting a change in capacitance of a capacitive strain sensor on a substrate, where the capacitive strain sensor includes a differential capacitor that includes a first strain sensing element, a second strain sensing element, and a bending beam positioned between the first strain sensing element and the second strain sensing element such that strain in the substrate deforms the bending beam causing the change in capacitance. In addition, the method also includes the step of determining a value corresponding to the strain in the substrate based on the change in capacitance.

As described above, the first and second strain transfer elements may be attached to a substrate. In addition, the first and second strain transfer elements may be configured to transfer strain in the substrate along a sensing axis to the bending beam to cause a detectable change in capacitance. As described above, the sensor is configured to enhance the effect of strain in the substrate along the sensing axis and attenuate the effect of strain in the substrate along a cross-axis transverse to the sensing axis.

In certain embodiments, methods for detecting strain in a substrate include the step of attaching a capacitive strain sensor to a substrate, wherein the capacitive strain sensor includes a differential capacitor that includes a first strain sensing element, a second strain sensing element, and a bending beam positioned between the first strain sensing element and the second strain sensing element, such that strain in the substrate deforms the bending beam. In some instances, the method also includes the steps of: detecting a change in capacitance of the differential capacitor caused by deformation of the bending beam; and determining a value corresponding to the strain in the substrate based on the change in capacitance.

In some cases, attaching the strain sensor to the substrate includes brazing the strain sensor to the substrate. Brazing is an intermetallic bonding technique where a braze metal or braze alloy is heated to its melting temperature or above and distributed between two or more close-fitting parts by capillary action. Where desired, the attaching includes electroplating the substrate before the brazing. Electroplating the substrate may facilitate wetting of the substrate with the braze material during the brazing process. In some instances, the substrate is electroplated with a metal, such as, but not limited to, copper, nickel, and the like. The strain sensor may then be contacted with the electroplated substrate. The braze material may be contacted with the substrate either before or after the strain sensor is contacted with the substrate. In some cases, the braze material is heated to its melting temperature or above during the brazing process. The braze material may be heated using any suitable heating technique, such as, but not limited to, induction heating, infrared heating, resistance brazing, electron beam brazing, laser brazing, and the like. In certain instances, the heating is localized heating of the braze material without significantly overheating the substrate or the strain sensor.

Additional embodiments include a method of making a capacitive strain sensor. The method includes the step of etching a silicon on insulator (SOI) wafer in the pattern of a capacitive strain sensor, where the capacitive strain sensor includes a differential capacitor that includes a first strain sensing element, a second strain sensing element, and a bending beam positioned between the first strain sensing element and the second strain sensing element. The method also includes the step of releasing the capacitive strain sensor from the wafer.

In certain embodiments, the capacitive strain sensors are fabricated using Micro-Electro-Mechanical System (MEMS) fabrication techniques. Embodiments of the fabrication process are described in detail below. In some cases, the SOI wafer is etched using methods including, but not limited to reactive-ion etching (RIE), deep reactive-ion etching (DIRE), the Bosch process (i.e., pulsed or time-multiplexed etching), and the like.

In certain embodiments, the capacitive strain sensors are made from a 4-inch SOI wafer. In some cases, the SOI wafer includes a device layer, where the device layer has a thickness ranging from 10 μm to 100 μm, such as from 10 μm to 50 μm, including from 20 μm to 30 μm. Where desired, the device layer has a thickness of 25 μm. In certain embodiments, SOI wafer includes an insulator layer, where the insulator layer has a thickness ranging from 1 μm to 20 μm, such as from 1 μm to 10 μm, including from 1 μm to 5 μm. Where desired, the insulator has a thickness of 2 μm. In certain embodiments, the insulator is a buried silicon oxide layer. The SOI wafer may include a single crystal silicon (SCS) substrate (i.e., the handle wafer). The SCS substrate may have a thickness ranging from 100 μm to 1000 μm, such as from 200 μm to 700 μm, including from 400 μm to 6000 μm. Where desired, the SCS substrate has a thickness of 500 μm.

The strain sensor may be wirebonded to a circuit board using commercial, off-the-shelf (COTS) electronics. In certain embodiments, the wirebond includes, but is not limited to, an aluminum wirebond, a gold wirebond, and the like. The device layer may be P-type doped and may have a resistivity ranging from 0.0001 to 2 Ω-cm, such as from 0.001 to 1 Ω-cm, including from 0.001 to 0.1 Ω-cm, for example from 0.001 to 0.01 Ω-cm. Where desired, the device layer has a resistivity of 0.002 Ω-cm. In certain cases, the resistivity of the device layer is chosen to facilitate Schottky contact between an aluminum wirebond and the silicon structure.

In some embodiments, the method further includes the step of applying a passivation layer to the capacitive strain sensor. The passivation layer may have a thickness ranging from 10 nm to 200 nm, such as from 30 nm to 150 nm, including from 50 nm to 100 nm. Where desired, the passivation layer has a thickness of 70 nm or less. For example, the passivation layer can have a thickness of 60 nm or less. The passivation layer may be deposited on the stain sensor using methods including, but not limited to, chemical vapor deposition (CVD), atmospheric pressure chemical vapor deposition (APCVD), low pressure chemical vapor deposition (LPCVD), ultra-high vacuum chemical vapor deposition (UHVCVD), RF sputtering, and the like. In some embodiments, the passivation layer includes silicon carbide. The silicon carbide passivation layer may be deposited on the strain sensor using LPCVD.

Kits

Also provided are kits that find use in practicing the subject methods. For example, kits for practicing the subject methods may include one or more capacitive strain sensors of the present disclosure. In certain embodiments the kits include adhesives, solder, braze metals, braze alloys, etc. for use in immobilizing the strain sensors on a surface of a substrate. In other embodiments, the strain sensors are attached to a substrate prior to being provided to a user.

In addition to the above components, the subject kits may further include instructions for practicing the subject methods. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, etc. Another means would be a computer readable medium, e.g., diskette, CD, DVD, computer-readable memory, etc., on which the information has been recorded or stored. Yet another means that may be present is a website address which may be used via the Internet to access the information at a removed site. Any convenient means may be present in the kits.

Utility

As can be seen, the capacitive strain sensors of the present disclosure find use in a variety of different applications where it is desirable to use capacitive strain sensors. In certain embodiments, the capacitive strain sensors find use where it is desirable to use capacitive strain sensors that can function accurately in harsh environments. The capacitive strain sensors of the present disclosure can be used anywhere where it is desirable to provide real-time measurements of the strain in a substrate. In addition, the passivation layer on the capacitive strain sensors allows the strain sensors to be used in applications where the strain sensor is exposed to harsh ambient conditions, such as large vibrations, high-g shocks, the presence of corrosive liquids or gases, continual contact wearing, high temperature, and the like. In certain embodiments, the methods are directed to capacitive strain sensors that find use in applications such as, but not limited to measuring strain in substrates used for automotive (e.g. active suspension, driveshaft monitoring, etc.), aerospace (e.g. satellite, airframes, landing gear monitoring, etc.), buildings, dams, bridges, oil well lodging and drilling (e.g. monitoring drilling bits), pipeline monitoring, gas turbines, industrial system control, and the like.

For example, capacitive strain sensors of the present invention may be used for monitoring strain in a driveshaft of an automobile. In certain embodiments, one or more capacitive strain sensors are attached to the driveshaft. In some cases, a capacitive strain sensor can be attached to the driveshaft such that the sensing axis of the strain sensor is aligned with the rotational axis of the driveshaft. In other cases, a capacitive strain sensor can be attached to the driveshaft such that the sensing axis of the strain sensor is at an angle to the rotational axis of the driveshaft. The strain sensor may be attached to the driveshaft such that the angle between the sensing axis and the rotational axis of the driveshaft is from 1° to 90°, such as at an angle ranging from 10° to 80°, from 20° to 70°, from 30° to 60°, or from 40° to 50°. In some cases, the strain sensor is attached to the driveshaft such that the angle between the sensing axis and the rotational axis of the driveshaft is 45°. In certain embodiments, two or more capacitive strain sensors can be attached to the driveshaft at different angles with respect to the rotational axis of the driveshaft. For example, strain sensors may be attached to the driveshaft in a Wheatstone Bridge configuration. In some cases, the capacitive strain sensors are configured to communicate with a processor, such that the strain sensor detects strain in the driveshaft and produces strain data as a result. The strain data can then be communicated with the processor, for example a computer in the automobile. In some cases, the processor can use this data to, for instance, alter the performance of the automobile, enhance the driving experience of the driver, and the like. The strain sensor may be operatively connected to a communication link for communicating with other devices, such as, but not limited to, a wired communication link (e.g., a USB, serial, or parallel interface, and the like), or a wireless communication link (e.g., Bluetooth, 802.11, cellular, infrared, RF, and the like). In some instances, the communication link is also used to transmit power to the strain sensor.

In some instances, the strain sensors may be used to measure torque applied to a substrate. Torque is the tendency of a force to rotate an object about an axis (i.e., how hard an object is rotated). For example, the torque sensors may be used to measure torque in an automotive driveshaft. Similar to the strain sensors described above, a torque sensor can be attached to the driveshaft such that the sensing axis of the torque sensor is aligned with the rotational axis of the driveshaft. In other cases, the torque sensor can be attached to the driveshaft such that the sensing axis of the torque sensor is at an angle to the rotational axis of the driveshaft. The torque sensor may be attached to the driveshaft such that the angle between the sensing axis and the rotational axis of the driveshaft is from 1° to 90°, such as at an angle ranging from 10° to 80°, from 20° to 70°, from 30° to 60°, or from 40° to 50°. In some cases, the torque sensor is attached to the driveshaft such that the angle between the sensing axis and the rotational axis of the driveshaft is 45°.

Other uses for the capacitive strain sensors include uses where the strain sensors are exposed to harsh conditions, for example, on drill bits, which in some cases can be exposed to large vibrations, high-g shocks, corrosive gases, corrosive liquids, high temperature, continual contact wearing, and the like. For example, in some cases, one or more capacitive strain sensors can be attached to a drill bit to monitor strain in the drill bit. The one or more strain sensors can be attached to the drill bit at intervals along the length of the drill bit, such that strain along at least a portion of the drill bit is monitored. In other embodiments, the strain sensors can be embedded within the drill bit. In some embodiments, the strain sensors are configured to communicate with a processor. For example, the resulting data from strain measurements can be communicated to a processor. In some cases, the processor can further include a display such that the results are outputted to a user in a human-readable format. Based on the results, the user can make a determination on the performance of the drill, the wear of the drill bit, and the like, and take the appropriate action accordingly.

As can be appreciated from the disclosure provided above, the present disclosure has a wide variety of applications. Accordingly, the following examples are offered for illustration purposes and are not intended to be construed as a limitation on the invention in any way. Those of skill in the art will readily recognize a variety of noncritical parameters that could be changed or modified to yield essentially similar results. Thus, the following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Celsius, and pressure is at or near atmospheric.

EXAMPLES

Fabrication Process

Materials and Methods

The fabrication process used a 4-inch silicon-on-insulator (SOI) wafer with a 25 μm thick device layer, 2 μm thick insulator (buried silicon oxide), and 500 μm thick single crystal silicon (SCS) substrate (i.e., handle wafer). As will be explained in more detail below, for testing experiments, the sensor was wirebonded to a circuit board using commercial off-the-shelf (COTS) electronics. The device layer was chosen to be highly P-type doped with a resistivity of 0.002 Ω-cm in order to achieve Schottky contact between the aluminum wirebond and the silicon structure.

Figure 6:
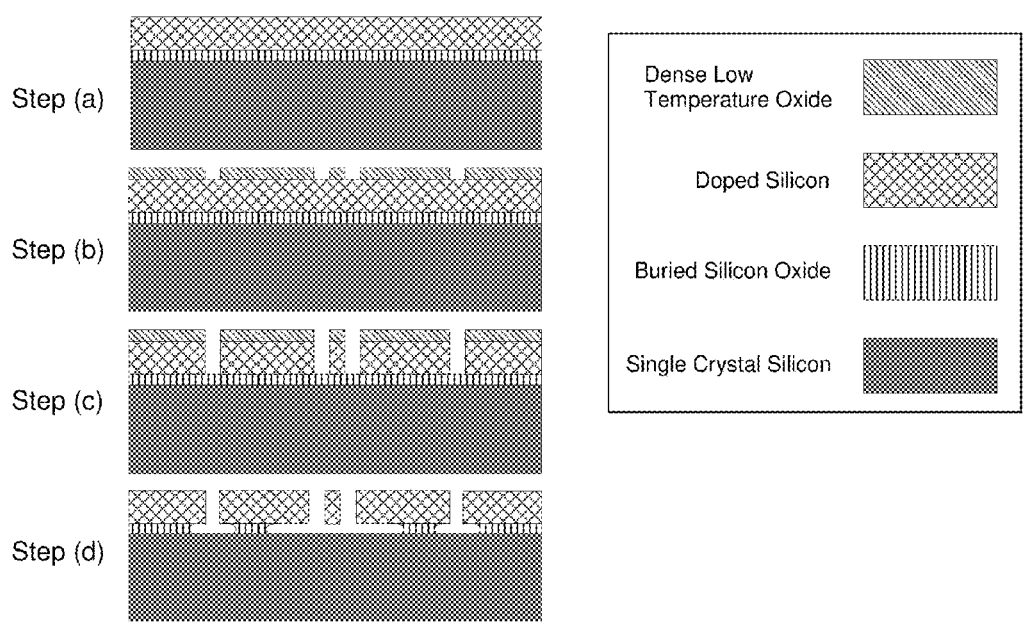
FIG. 6 shows a schematic of the basic fabrication process of an embodiment of the capacitive strain sensor.

FIG. 6 shows a schematic of the basic fabrication process of the capacitive strain sensor of the present disclosure. A 4-inch SOI wafer was cleaned in a heated Piranha bath at 120° C. for 20 minutes followed by a deionized (DI) water rinse and dry step (see FIG. 6, step (a)). A 1 µm thick low temperature silicon oxide (LTO) layer was deposited on the wafer using a low pressure chemical vapor deposition (LPCVD) chamber. The oxide layer was densified by annealing for 1 hour at 800° C. in nitrogen gas. Using a coating track, 1 µm of positive I-line photoresist (PR) was spun at 4100 rpm over the device layer surface already coated by LTO. This step was followed by 60 seconds of soft baking at 90° C. to prepare for the photolithography step. A GCA wafer stepper was used to expose the wafer for the layout. After developing the exposed PR for 1 minute using OPD 4262 (Olin Corp., Clayton, Mo.), the wafer was hard baked at 120° C. for 2 hours. As shown in FIG. 6, step (b), the silicon oxide layer was etched by Reactive Ion Etching (RIE). A cleanup step using plasma etching removed the rest of the PR mask, to prepare the wafer for the Bosch process. In order to form the mechanical structures, a low frequency DRIE Bosch process was used to etch the high aspect device with a maximum aspect ratio of 20% (FIG. 6, step (c)). A 10:1 buffered HF bath was used to etch away the oxide mask and release the structures (FIG. 6, step (d)), followed by a critical point dry (CPD) step using liquid $CO_2$ to dry out any liquid and prevent any stiction. Table 1 shows a table describing an embodiment of a microfabrication process for an SOI-based capacitive strain sensor.

TABLE 1

CAPRUN3 Process for SOI-based Capacitive Strain Sensor

| Process | Equipment | Time | Parameter(s) | Note |
|---|---|---|---|---|
| SOI Wafer Cleaning #1 | Sink8 | | | Not required for new SOI wafers. |
| | Piranha Bath | 00:10:00 | Temperature: 120° C. | Spiked by 100 ml Hydrogen Peroxide |
| | DI Water Rinse | | | 4 Cycles |
| | Spin Dry | 00:04:00 | | |
| SOI Wafer Cleaning #2 | Sink6 | | | |
| | Piranha Bath | 00:10:00 | Temperature: 120° C. | Spiked by 100 ml Hydrogen Peroxide |
| | DI Water Rinse | | | 4 Cycles |
| | Spin Dry | 00:04:00 | | |
| LTO Deposition | Tystar12 | 01:00:00 | Temperature: 450° C. | To deposit 1 µm LTO |
| LTO Layer Anneal | Tystar4 | 01:00:00 | Temperature: 900° C. | In presence of Nitrogen gas |
| Dehydration | VWR Oven | 00:20:00 | Temperature: 115 ± 5° C. | |
| HMDS Deposition | Sink5 | 00:10:00 | | |
| Photoresist Deposition | SVGCoat | | Spin Speed: 4100 rpm | To deposit 1.1 µm of I-Line PR |
| | Soft bake | 00:01:00 | Temperature: 90° C. | |
| Photo-Lithography | GCAWS2 | | Exposure time: 0.78 sec | 10:1 exposure |
| Develop | SVGDev | 00:01:00 | No bake | |
| Descum Photoresist | Technics C | 00:01:00 | Oxygen flow: 51.1 sccm Power: 50 Watts Pressure: 270-280 mTorr | Facilitates smoothing of the edges of the photoresist mask |
| Hard Bake | UVBake | 00:01:00 | Maximum Temperature: 200° C. | Post optical inspection of the edges of fine features was performed |
| Oxide Etch | Lam2 | | Etch rate: ~5000 Å/min | |
| Silicon Dry Etch | STS | 00:15:00 | Etch rate: ~2.18 µm/min | Low-Frequency Recipe: ROLF2B (31% overetch) |
| Stripping Photoresist | Technics C | 00:08:00 | Oxygen flow: 51.1 sccm Power: 300 Watts Pressure: 270-280 mTorr | Followed by 1 cycle of Acetone and IPA rinse. |

TABLE 1-continued

CAPRUN3 Process for SOI-based Capacitive Strain Sensor

| Process | Equipment | Time | Parameter(s) | Note |
|---|---|---|---|---|
| Protective Photoresist | Spinner1 | | | Facilitates protection of the structures through the dicing step |
| Soft Bake Dicing | Hot Plate Disco | 00:01:00 | Square dice: 10.88 × 10.88 mm | |
| Stripping Photoresist | Sink432A | 01:00:00 | | Followed by 1 cycle of IPA and DI water rinse. |
| Wet Etch Release | Sink432A | 1:52:00 | BHF 5:1 | 3 drops of surfactant facilitates the release in high aspect ratio trenches. |
| | BHF → Water → Ethanol | | $6 < pH \leq 7$ | Through cycles rinsing using aspirator and DI water rinse |
| Critical-Point Dry | CPD | 00:50:00 | | |

The strain sensor was subsequently coated with a silicon carbide passivation layer using Low Pressure Chemical Vapor Deposition (LPCVD). Table 2 shows a table describing an embodiment of a process for applying a silicon carbide coating to an SOI-based capacitive strain sensor using LPCVD. To minimize any contamination in the LPCVD SiC deposition tool, the step of SiC deposition was done immediately after the CPD step. The dice were placed in a new and clean die tray, sealed by tape and transferred to the LPCVD furnace.

TABLE 2

Process for LPCVD Deposition of Silicon Carbide

| Process | Equipment | Time | Parameter(s) | Note |
|---|---|---|---|---|
| SiC Deposition | Tystar15 | 00:20:00 | Temperature: 800-850° C. Deposition rate: ~300 nm/hr DSB: 45 sccm Pressure: 150 Torr DCS: 20 sccm | |

Model System

The mechanical gain and structural behavior of the capacitive strain sensors were modeled using Bernoulli-Euler beam theory. The general assumptions enforced by this theory with analysis are: (1) The beams are long, slender and inextensible. The beams also keep the same length during the bending; (2) The beam cross-section is constant along its axis and remains plane during bending; and (3) The deformations remain small which means substantially no occurrence of buckling, plastic deformation or material softening.

The boundary conditions of the bending beam were $\Delta x$ displacement and end rotations $\theta$, introduced by rigid regions: (see FIG. 4).

$$\theta = \frac{\Delta x}{L_r}$$

($L_r$=rigid region length)

Using the governing equation for a beam under pure bending given the aforementioned boundary conditions results in the following equation for deflection of the beam:

$$y_{beam} = \frac{4(\delta_m - \Delta x)}{L^2}x^2 - \frac{4(\delta_m - \Delta x)}{L}x + \Delta x$$

Where the bending beam deflection is related to the applied displacement at the anchors by:

$$\delta_m = \Delta x + \frac{\Delta x \cdot L}{4L_r}$$

In order to analytically model the differential capacitive readout, the capacitance was integrated over the length of the bending region.

$$C = \varepsilon_o b \int_0^L \left( \frac{4(\delta_m - \Delta x)}{L^2}x^2 - \frac{4(\delta_m - \Delta x)}{L} + \Delta x + g_o \right)^{-1} dx$$

$$\Delta C_{readout} = |C_2 - C_1|$$

Where b is the thickness of the device layer and $g_o$ is the initial gap. A finite element analysis (FEA) of the strain sensor was performed and the results correlated well (e.g., within 12%) with the analytical model (see FIG. 7). The shear (cross-axis) strain effect was also modeled by FEA, which showed that cross-axis strain deforms the middle bending region into an S-shaped curve. The beam deflection equation due to the cross-axis displacement was modeled. The shear strain generates $\Delta x$ lateral displacement and the end rotation for the middle bending region:

$$\theta = \frac{\Delta x}{L_T}$$

($L_T$=strain transfer beam length)

The change of capacitance due to lateral displacement $\Delta x$ was attenuated since the capacitive area was not affected by the movement of the strain transfer elements. Also, the deflection of the beam due to the end rotations for each half of the S-shape is given by the equation:

$$y_{beam} = \frac{2\Delta x}{L_T L^2}x^3 - \frac{3\Delta x}{L_T L}x^2 + \frac{\Delta x}{L_T}x + g_o$$

The differential capacitive signal due to cross-axis strain across half of the middle bending region is calculated by:

$$C = \varepsilon_o b \int_0^L \left(\frac{2\Delta x}{L_T L^2}x^3 - \frac{3\Delta x}{L_T L}x^2 + \frac{\Delta x}{L_T}x + g_o\right)^{-1} dx$$

Using the above equations, the S-shaped curve deflection of the bending beam due to cross-axis strain was shown to have substantially no contribution to $\Delta C_{readout}$.

Finite Element Analysis (FEA)

Finite Element Analysis (FEA) was used to simulate the structural design and its performance as compared with the analytical modeling. The design was modeled through macro scripts and processed by ANSYS 5.7. The structure was modeled by a 10-node tetrahedral solid element suited for deformed shapes. In this model, the strain actuator was replaced by a loop to apply predefined displacements at the strain transfer elements. Although the ratio of gauge length to rigid region length determines the mechanical gain, a series of analysis was performed to insure the rigidity of both ends of the bending beam for maximum displacement transfer rate. In the finite element analysis, the material was considered homogeneous and the behavior of the structure was assumed to have a uniform thickness. A gauge length of 1000 μm was used to determine the range of displacement applied.

In order to measure the capacitance, two physics environments were defined which first determined the deformed shape of the structure through the mechanical mode and updated the locations of the structural nodes. Following that, a new electrical environment was applied to the updated structural shape which defined the bending structure and the capacitive strain sensing elements as two electrodes of a capacitor to calculate the new capacitance relative to the initial capacitance, $C_o$. The capacitance data vs. applied displacement was stored. The data was processed to determine the capacitance readout.

Strain Actuation

Figure 14A:
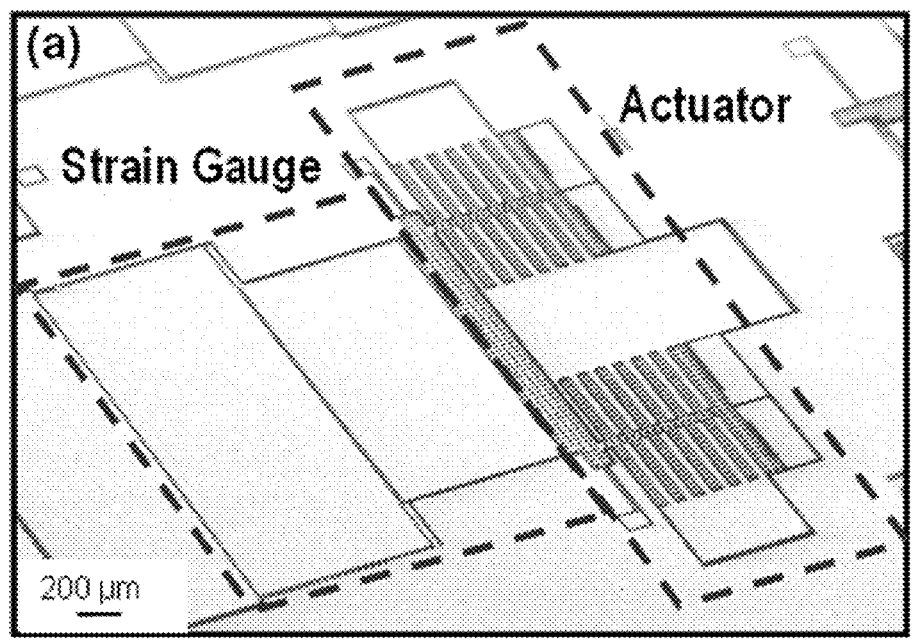
FIG. 14A shows a SEM image of a capacitive strain gauge with added sense-axis strain actuator.
Figure 14B:
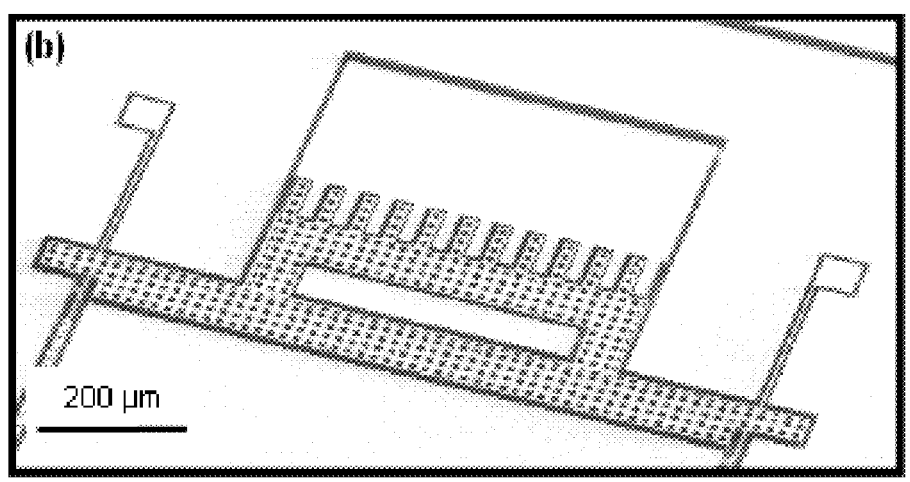
FIG. 14B shows a SEM image of a cross-axis strain actuator.

In order to study the sensor performance under a fully controlled range of strain independent of the bond quality, a gap closing parallel-plate on-chip strain actuator for both sense-axis and cross-axis shear strain was used. The parallel-plate on-chip strain actuator replaced the first strain transfer element and was used to generate the sense-axis and cross-axis strain. (see FIG. 14A).

Results

The microfabricated sensor was tested using a commercial, off-the-shelf (COTS) universal capacitive readout IC, MSC3110 from Irvine Sensors Corporation (Costa Mesa, Calif.) with a noise level of 4 aF/√Hz connected to a sensing element through a printed circuit board (PCB). The universal readout IC (URIC) was a programmable EEPROM. A high voltage supplier was used to generate the electrostatic force necessary for the strain actuator comb-drive set. The output signal was detected using an NI USB-6008 data acquisition board from National Instruments (Austin, Tex.). The initial capacitance of the device was $C_o$=50 fF which was below the threshold of the acceptable input capacitance to the URIC. Therefore, the IC chip was programmed to include two equal offset capacitances in parallel with the sensor capacitors to increase the initial capacitance to pF level using the programming software which tunes the reference trims, gains and capacitances. Two strain sensors, e.g. Die#1 and Die#2, were randomly chosen from different locations on the wafer. More than 85% of the microfabricated dice were eventually used for SOI-based and SiC coated SOI-based strain sensors, which reflects the high yield of the microfabrication process. An operating range of 1-1000με range was used for the strain sensors. In order to test the sense-axis and cross-axis response of the devices, each strain sensor was separately wirebonded to the PCB using aluminum wirebonds and tested.

Figure 7:
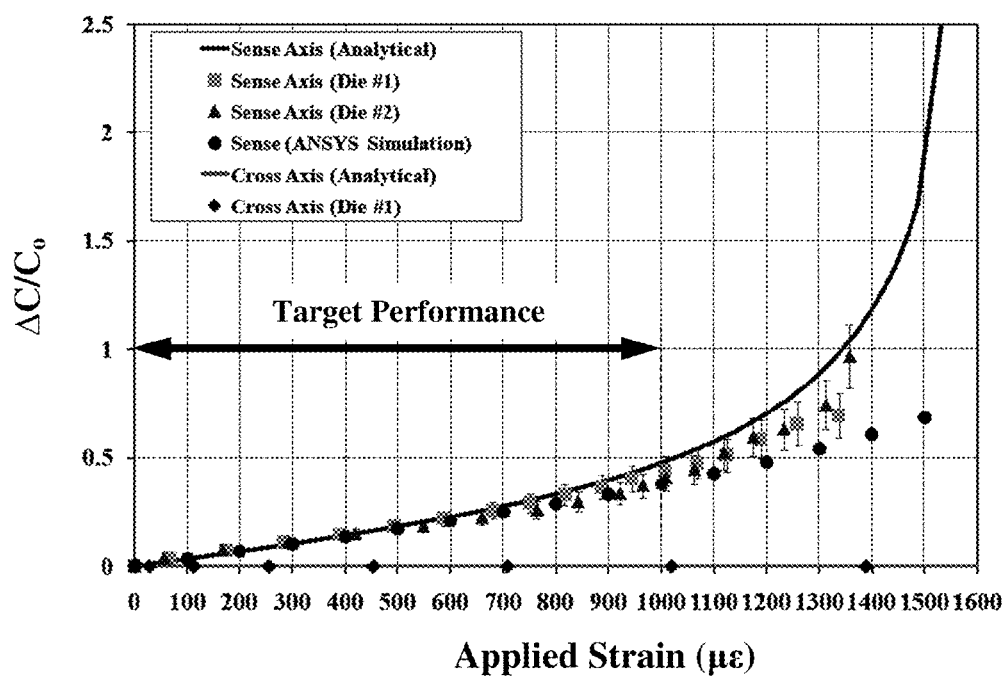
FIG. 7 shows a graph of experimental vs. simulation and analytical results for sense-axis and cross-axis actuation.

The experimental vs. simulation and analytical results for sense-axis and cross-axis strain are shown in FIG. 7. Over the performance range, the strain sensor correlated well with the results from analytical modeling and also FEA simulation and all fell within a 10% error bar. The strain sensor had 50 aF/με sensitivity. The nominal resolution of the strain sensor was determined by the readout circuit. The resolution of the strain sensor was 0.08με at 1 Hz bandwidth.

The cross-axis response of the sensor is also shown in FIG. 7. The FEA simulation predicted that the mechanical design of the strain sensor would attenuate 90% or more of the cross-axis contribution to the sense-axis strain readout. The cross-axis capacitive signals were two orders of magnitude weaker than the sense-axis, indicating that the strain sensor attenuated 99% or more of the cross-axis contribution to the sense-axis strain readout. Therefore, the superposition of both axes generated a clear signal of the desired sense-axis direction.

Noise, Resolution, Sensitivity and Bandwidth

A COTS readout IC was used which lumped the noise associated with the device and introduced the 4 aF/√Hz resolution at the range of 0.5-8 kHz bandwidth. The IC readout electronics determined the noise floor for the measurement. The data measurement rate was chosen up to 8 kHz which determined the noise floor at 7.15με. Therefore, the developed sensor had enhanced performance at the low-bandwidth application. The capacitive strain sensor can resolve strains as low as 0.08με. Industrial applications which may benefit from strain data acquisition can be accurately monitored at 120 measurements per second which corresponds to a 0.88με noise floor. The microfabricated sensor was connected to the PCB by seven aluminum wirebonds. Despite using a grounded electrical shield, wirebonds and their proximity to the structures generated up to 0.224 mV/√Hz which corresponds to 12.34με/√Hz parasitic feed-through. The bandwidth of the strain sensor was 472 Hz.

Noise Analysis

The sources of noise for the strain sensor were categorized into two parts: electronics noise and mechanical noise. The electrical noise is associated with the sensing circuit and is lumped into the resolution of the COTS chip (e.g., 4 aF/√Hz). Since the strain sensor operates in air, a significant portion of the mechanical noise source is due to thermal/Brownian motion of air molecules. A Brownian noise analysis was performed to determine the overall strain resolution. It was assumed that fluctuating mechanical resistant force F(R,T)

was applied as a constant force on the bending beam. Nyquist's relation for thermal noise is as follows:

$$F=\sqrt{4k_BTR}$$

where $k_B$ is the Boltzmann constant, T is the absolute temperature (Kelvin) and R is the mechanical viscous damping force due to performance in the air.

In addition, to perform a dynamic analysis of the bending beam, the strain sensor was modeled as a simply supported vibrating beam. The resistant force was modeled using a squeeze film damping model for the parallel plates:

$$R = \frac{3\mu A^2}{2\pi g_o^3}$$

$$R = 4.3 \mu N \cdot s/m$$

where $\mu$ is air viscosity at room temperature.

The analysis was performed at room temperature, therefore the maximum constant mechanical resistant force applied to the middle bending region equaled to:

$$F=2.67 \times 10^{-7} \, \mu N/\sqrt{Hz}$$

Using a distributed mass dynamic model the maximum bending deflection due to Brownian motion equaled to 4 $\mu m/\sqrt{Hz}$, which results in a change of capacitance in orders of magnitude less than atto-Farad capacitive sensing chip resolution (i.e., 4 $aF/\sqrt{Hz}$ electrical noise resolution). This indicates that the electronics noise was dominant in setting the noise floor for strain resolution.

Bandwidth Analysis

Transverse vibration analysis of thin uniform beams was used to assess the lower bound of the bandwidth. Under clamped-clamped boundary conditions the resonant frequency of the bending beam for the first mode (full half-wave) is given by the equation:

$$f = \frac{11.2}{\pi}\left(\frac{1}{L}\right)^2 \sqrt{\frac{EI}{\rho A}}$$

where I is the second moment of area of the device, E is the modulus of elasticity, and $\rho$ is the density of silicon.

The natural frequency of the bending beam vibration was calculated as 4720 Hz which results in 472 Hz bandwidth.

Silicon Carbide Passivation

Figure 8:
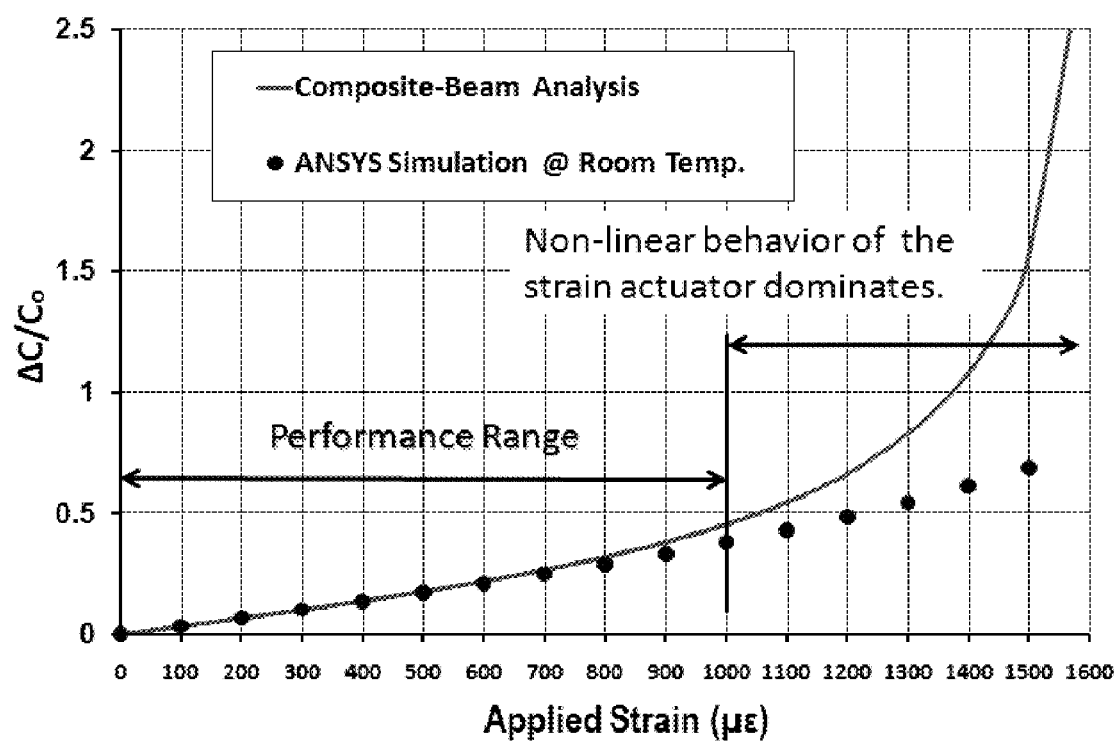
FIG. 8 shows a graph of a comparison between analytical and simulated SiC coated capacitive strain gauges.

Silicon carbide is about three times stiffer than silicon. A thin layer silicon carbide (SiC) coating over the beams of the strain sensor may introduce an increase in stiffness of 10% or more. A thin pinhole-free and conformal SiC coating was used to passivate the silicon structures. As shown in FIG. 8, the analytical model (i.e., with a strain actuator) correlated well with the ANSYS simulation (i.e., no actuator) of the strain sensor.

SiC deposition over a silicon-based sensor forms a substantially composite structure that can be analyzed using a composite-beam model. The SiC passivation layer was applied on the surface of the strain sensor away from the neutral axis of the beam, so even though the SiC passivation layer was orders of magnitude thinner than the structure of the strain sensor, the SiC passivation layer still made the coated structure less flexible. Using the Rayleigh method, the bending stiffness (EI) for the composite beam is given by the following equation:

$$EI_{comp} = \frac{E_{Si}wt_{SiC}^3}{12} + E_{SiC}\left(\frac{wt_{SiC}^2}{2} + \frac{t_{SiC}^3}{6}\right)$$

where $EI_{comp}$ is the composite beam's bending stiffness (EI), $E_{SiC}$ (about 490 GPa) and $E_s$, (about 160 GPa) are SiC and Si modulus of elasticity, respectively. w represents the Si beam width and $t_{SiC}$ is the SiC coating thickness.

The SiC coating did not have any significant effect on other physical dimensions or material attributes. LPCVD SiC deposition provided a highly-conformal coating around the structure of the silicon sensor and the on-chip strain actuator (see FIG. 12B). An FEA of the coated strain sensor was performed. The results of the FEA correlated within 12% with the analytical model (see FIG. 12A).

The SiC coating had a thickness of about 60 nm. The resultant composite beam was stiffer than a silicon-based beam (i.e., the SiC coated beam had a higher EI). A vibration analysis of the SiC coated beam showed the performance bandwidth was improved by 13% or more compared to a silicon-based structure, which gave a bandwidth of 535 Hz. Performance range was 1-1000$\mu\epsilon$. Beyond the performance range, e.g., above 1000$\mu\epsilon$, non-linear behavior of the strain actuator was observed.

SiC Passivation Layer Fabrication Process

Figure 9A:
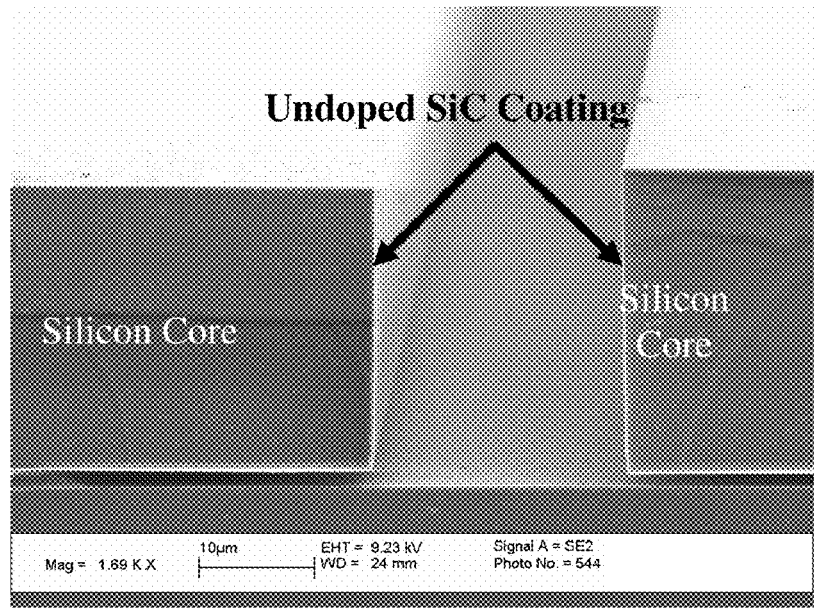
FIG. 9 shows SEM images of an encapsulated SOI-based structures (FIG. 9A).
FIG. 9B shows that the LPCVD layer of SiC covers underneath the structures.
Figure 9B:
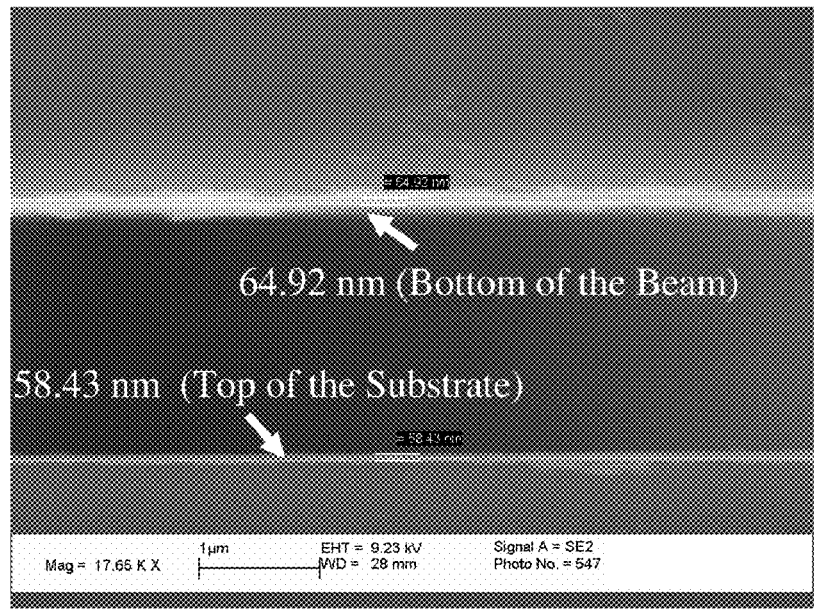

Following the SOI-based strain sensor microfabrication using the process described above, the dice were placed on the bottom of a closed boat in an LPCVD Tystar Titan II furnace. The LPCVD furnace used a single source 1,3-disilabutane (DSB) to conformally deposit undoped polycrystalline SiC on the silicon structures. The deposition parameters are shown in Table 3 below. Scanning Electron Microscopy (SEM) images of the cleaved dice (see FIGS. 9A-9B) showed that with a nominal deposition rate of 300 nm/hr, a 20 minute deposition yielded SiC coating with a thickness of about 60 nm.

TABLE 3

| Undoped SiC Deposition Parameters | |
| --- | --- |
| Temperature | 800-850° C. |
| DSB | 45 sccm |
| Pressure | 150 Torr |
| Dichlorosilane (DCS) | 20 sccm |

Harsh Environment Testing

Chemical Stability

Figure 15:
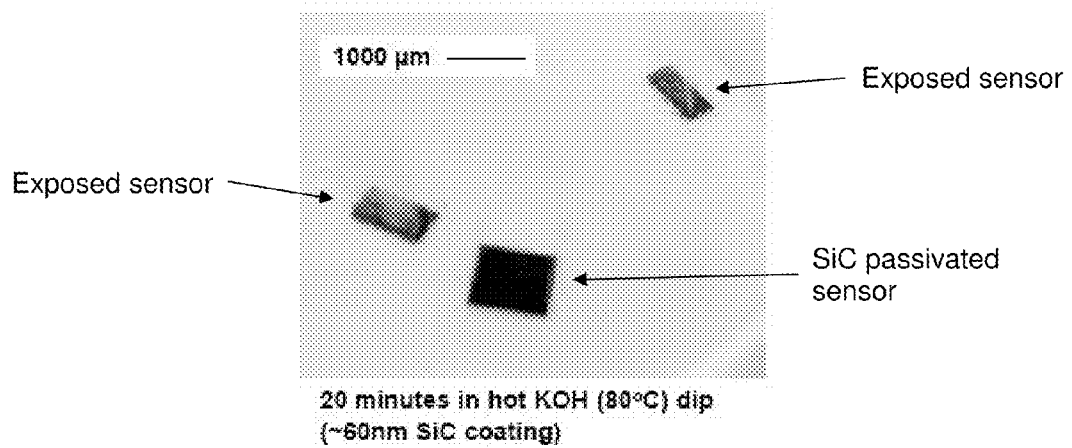
FIG. 15 shows an image of two exposed silicon sensors and a SiC passivated sensor in a KOH bath heated to 80° C.

The chemical stability of a SiC passivated strain sensor compared to an exposed SOI-based structure was tested in a KOH bath heated to 80° C. Two cleaved and intact dice were placed in the KOH bath. Within 20 minutes, the exposed silicon structures in the cleaved die were etched and started bubbling, while the SiC coated die stayed substantially intact (see FIG. 15).

Figure 10:
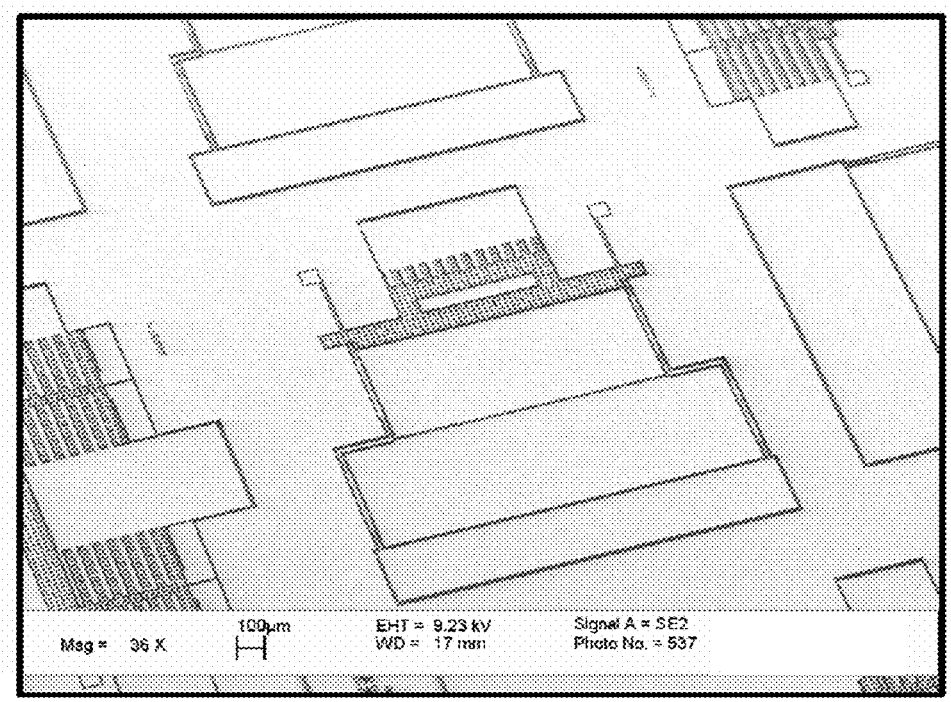
FIG. 10 shows a SEM image of a SiC passivated strain sensor after a KOH bath at 80° C.

The corrosion test was followed by a SEM inspection of the SiC coated strain sensor. The SEM images showed substantially no cracks, defects or erosion of the SiC passivated structures (see FIG. 10). The encapsulating film of SiC was substantially pin-hole free and had substantially no micropipes.

High Temperature Resistance

Figure 11:
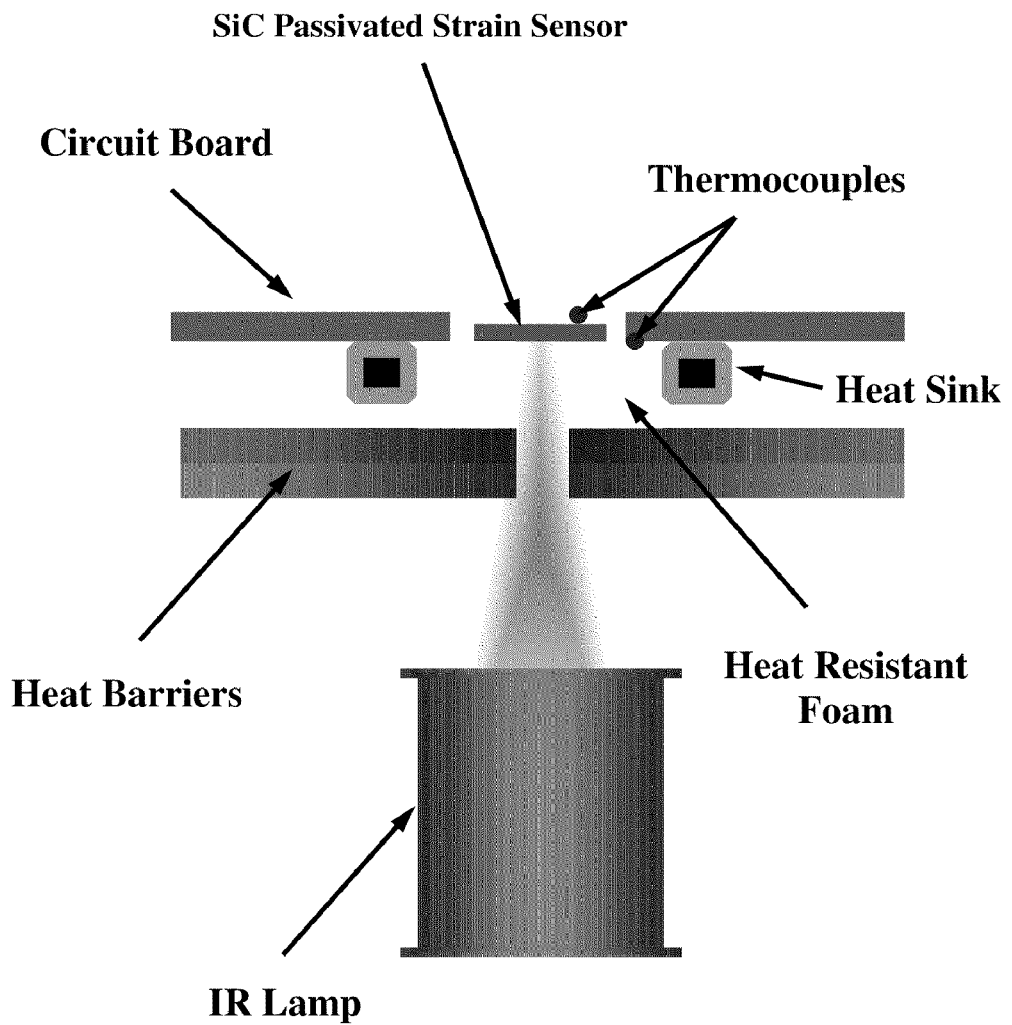
FIG. 11 shows a schematic of the high temperature testing setup for the SiC passivated strain sensor of the present disclosure.

To test performance at high temperatures, the SiC coated die was heated to 370° C. or more while the electronics were kept below 125° C. As shown in FIG. 11, an infrared lamp (SpotIR 4150; Precision Control Systems, Inc./Research Inc., Eden Prairie, Minn.) was used to heat the die. The temperature testing setup was used to test a silicon test die coated by polycrystalline SiC. During the high temperature resistance tests, two thermocouples monitored the temperature of the die and the PCB board. The infrared lamp had a focal point at one inch above the lamp. Two layers of wood and aluminum sheet were used as heat dissipaters to shield and disperse the heat and a layer of heat resistant foam was used to fill the gaps between the bottom of the die and the heat dissipaters. A heat-sink was also used to balance the generated and dissipated heat (see FIG. 11). Thermal analysis showed substantially no hotspots were formed at the interface of SiC and Si.

Figure 12A:
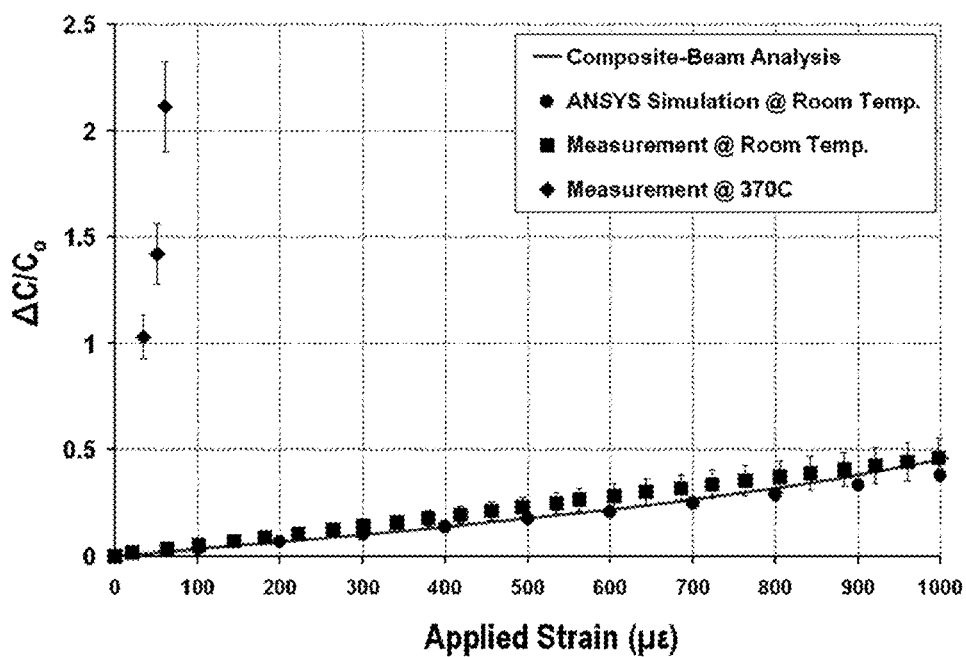
FIG. 12A shows a graph of results from a high temperature test of a SiC passivated strain sensor of the present disclosure.
Figure 12B:
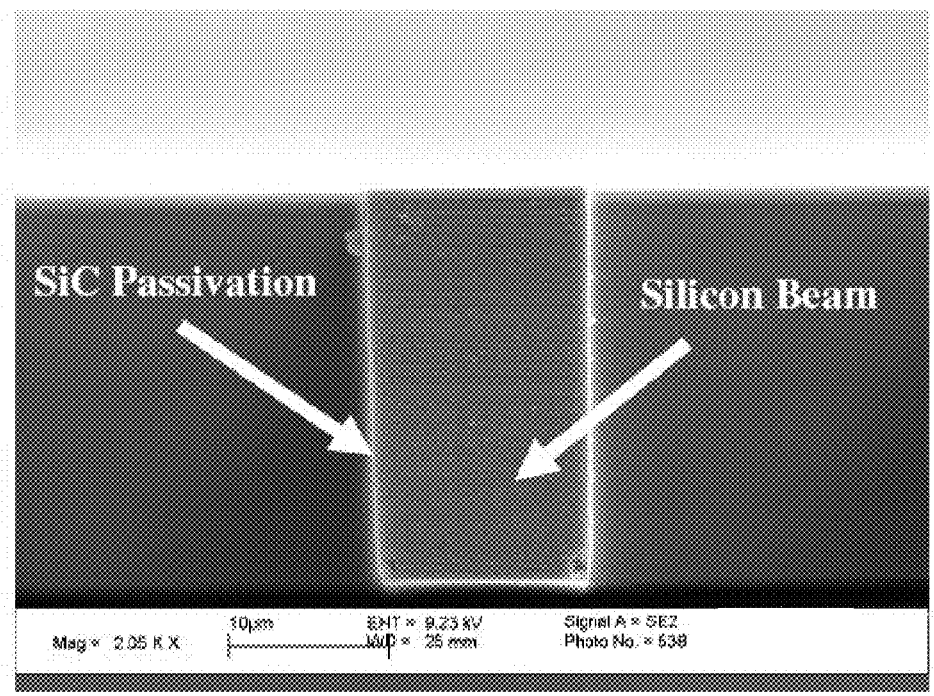
FIG. 12B shows a SEM image of a cross section of an embodiment of a strain sensor.

As shown in FIG. 12, the SiC encapsulated strain sensor was tested using the temperature testing setup shown in FIG. 11. The measurements were performed at room temperature and 370° C. (see FIG. 12A). At room temperature, the experimental results showed agreement within 12% between analytical and finite element analysis. The strain sensor had 45 aF/$\mu\epsilon$ sensitivity at the performance range of 1-1000$\mu\epsilon$. The experiments showed that the strain sensor operated successfully at 370° C. The strain measurements at 370° C. showed signs of temperature sensitivity. This sensitivity may be due to errors introduced by the capacitive readout IC sensitivity to high temperature and coefficient of thermal expansion (CTE) differences between the coating and device layer.

Variable Ambient Conditions

Hot gasses are one of the major sources of corrosion in numerous industrial applications. The performance of a SiC passivated strain sensor was tested under various ambient conditions. A steam generator was setup to blow dry steam over an operating strain sensor. The generated steam passed through an oven heated to 230° C. or more (to generate dry steam) and a stainless steel tube wrapped by a heater strip (to prevent any condensation). The dry steam was blown over the sensor operating at 370° C., while the rest of PCB was shielded by heat-resistant foam. There was substantially no change in the output voltage after application of the dry steam (data not shown), which indicated that the SiC passivated strain sensor was substantially insensitive in air to variations in ambient environmental conditions.

Wirebonding

Wirebonding to SiC can be achieved using aluminum wires. In the experiments described above, aluminum wirebonding was used and the strain sensors were connected to printed circuit boards by aluminum wirebonds.

Alternatively, wirebonding to SiC can be achieved using Au wires. In certain embodiments, Au wires are stable at high temperatures. The following process was prepared for ultrasonic wirebonding of Au to SiC using a West Bond Model 7400B wirebonder (West Bond, Inc., Anaheim, Calif.). First, a new bonding wedge was used. Then, the ultrasonic power and time was adjusted as shown in Table 4 below.

TABLE 4

Power and Time for Ultrasonic Wirebonding of Au to SiC

|  | SiC Pad | Au Pad |
| --- | --- | --- |
| Power | 900 | 630 |
| Time | 90 millisecond | millisecond |

Figure 13A:
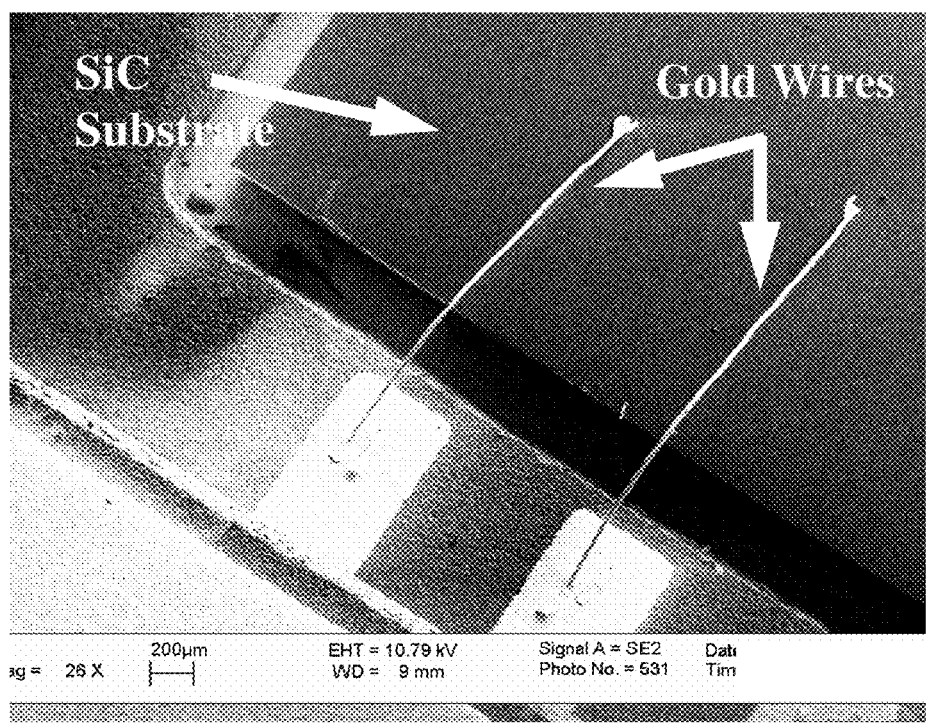
FIG. 13 shows SEM images of gold wires bonded to SiC substrate (FIG. 13A), and the shape and size of the bonds interfaced with SiC surface (FIG. 13B).
Figure 13B:
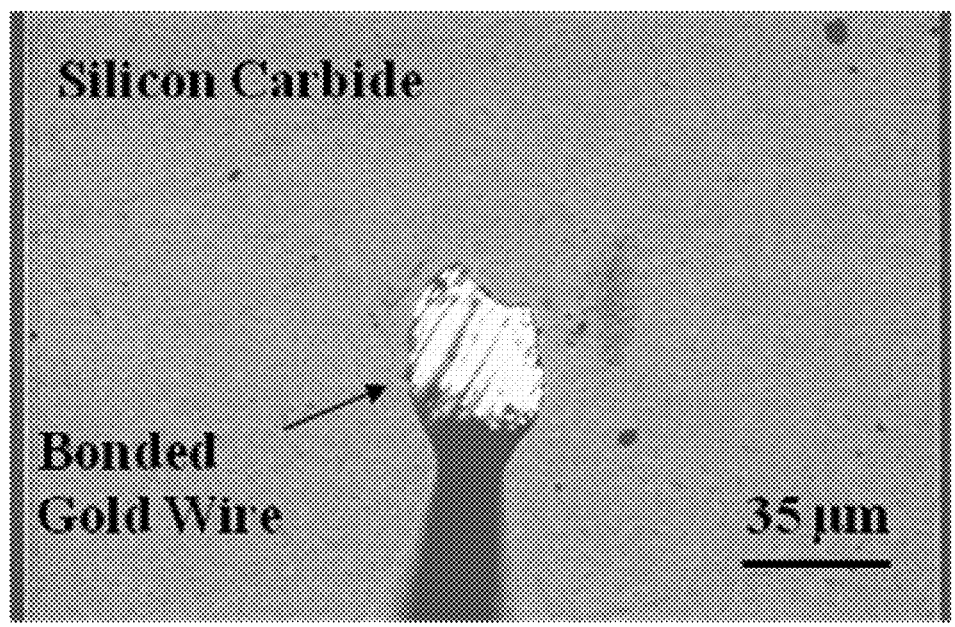

Next, the wire temperature was adjusted at 8° 00". Then the bonder wedge was gently pressed down on the SiC substrate for 1-2 seconds. As shown in FIGS. 13A-13B, the above wirebonding process resulted in the bonding of an electrical characterization package to a SiC substrate by multiple Au wires. Pull-tests showed that the Au—SiC bonds were primarily mechanically attached rather than bonded by ultrasonically molten wire. In addition, the resistance variation was found to be nominal when heated to above 600° C. (data not shown).

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

That which is claimed is:

1. A capacitive strain sensor comprising:
   a differential capacitor comprising:
      a first strain sensing element;
      a second strain sensing element; and
      a bending beam, wherein the bending beam is positioned between the first strain sensing element and the second strain sensing element, and wherein the sensor is configured to enhance the effect of strain in a substrate along a sensing axis and attenuate the effect of strain in the substrate along a cross-axis transverse to the sensing axis.

2. The strain sensor according to claim 1, further comprising a first strain transfer element and a second strain transfer element, wherein the bending beam is operatively coupled to the first strain transfer element and the second strain transfer element such that strain in the substrate deforms the bending beam causing a detectable change in capacitance of the sensor.

3. The strain sensor according to claim 1, further comprising one or more strain transfer beams, wherein the one or more strain transfer beams operatively couple the bending beam to the first strain transfer element and the second strain transfer element.

4. The strain sensor according to claim 3, comprising four strain transfer beams, wherein the four strain transfer beams are attached to the bending beam at four points, wherein the four points define a first rigid region, a bending region, and a second rigid region along the bending beam.

5. The strain sensor according to claim 4, wherein the strain transfer beams have a thickness of 5 μm or less.

6. The strain sensor according to claim 4, wherein the first rigid region and the second rigid region have thicknesses greater than the thickness of the bending region.

7. The strain sensor according to claim 6, wherein the first rigid region and the second rigid region have thicknesses ranging from 10 μm to 20 μm.

8. The strain sensor according to claim 6, wherein the bending region has a thickness of 5 μm or less.

9. The strain sensor according to claim 2, wherein the strain sensor is configured to detect strain in the substrate along the sensing axis.

10. The strain sensor according to claim 9, wherein the first strain transfer element, the second strain transfer element, the first strain sensing element, and the second strain sensing element are aligned along the sensing axis.

11. The strain sensor according to claim 9, wherein the strain sensor attenuates 90% or more of the effect of strain in the substrate along the cross axis.

12. The strain sensor according to claim 9, wherein the strain sensor attenuates 99% or more of the effect of strain in the substrate along the cross axis.

13. The strain sensor according to claim 1, further comprising a passivation layer.

14. The strain sensor according to claim 13, wherein the passivation layer has a thickness of 70 nm or less.

15. The strain sensor according to claim 14, wherein the passivation layer comprises silicon carbide.

16. The strain sensor according to claim 1, wherein the strain sensor has a sensitivity of 45 aF/με or more.

17. A method for detecting strain in a substrate comprising:
   detecting a change in capacitance of a capacitive strain sensor on a substrate, wherein the capacitive strain sensor comprises a differential capacitor comprising:
      a first strain sensing element;
      a second strain sensing element; and
      a bending beam positioned between the first strain sensing element and the second strain sensing element such that strain in the substrate deforms the bending beam causing the change in capacitance; and
   determining a value corresponding to the strain in the substrate based on the change in capacitance.

18. A method for detecting strain in a substrate comprising:
   attaching a capacitive strain sensor to a substrate, wherein the capacitive strain sensor comprises a differential capacitor comprising:
      a first strain sensing element;
      a second strain sensing element; and
      a bending beam positioned between the first strain sensing element and the second strain sensing element, such that strain in the substrate deforms the bending beam;
   detecting a change in capacitance of the differential capacitor caused by deformation of the bending beam; and
   determining a value corresponding to the strain in the substrate based on the change in capacitance.

19. The strain sensor according to claim 1, wherein the bending beam is positioned within a gap between the first strain sensing element and the second strain sensing element.

* * * * *